(12) United States Patent
Albert Revert et al.

(10) Patent No.: US 12,157,692 B2
(45) Date of Patent: Dec. 3, 2024

(54) INDUSTRIAL WASTEWATER TREATMENT SYSTEM AND METHOD FOR GARMENT FINISHING, JEANS AND DENIM INDUSTRY

(71) Applicant: JEANOLOGIA, S. L., Paterna (ES)

(72) Inventors: Vicente Albert Revert, Paterna (ES); Victoria Puchol Estors, Paterna (ES)

(73) Assignee: Jeanologia S. L., Paterna (ES)

( * ) Notice: Subject to any disclaimer, the term of this patent is extended or adjusted under 35 U.S.C. 154(b) by 796 days.

(21) Appl. No.: 17/416,031

(22) PCT Filed: Dec. 20, 2019

(86) PCT No.: PCT/IB2019/061202
§ 371 (c)(1),
(2) Date: Jun. 18, 2021

(87) PCT Pub. No.: WO2020/129013
PCT Pub. Date: Jun. 25, 2020

(65) Prior Publication Data
US 2022/0073395 A1 Mar. 10, 2022

(30) Foreign Application Priority Data
Dec. 21, 2018 (EP) ..................................... 18382970

(51) Int. Cl.
*C02F 9/00* (2023.01)
*B01D 24/00* (2006.01)
(Continued)

(52) U.S. Cl.
CPC .............. *C02F 9/00* (2013.01); *B01D 24/007* (2013.01); *C02F 1/004* (2013.01); *C02F 1/283* (2013.01);
(Continued)

(58) Field of Classification Search
None
See application file for complete search history.

(56) References Cited

U.S. PATENT DOCUMENTS

2008/0314807 A1* 12/2008 Junghanns ........... B01D 61/025
210/85
2010/0166625 A1* 7/2010 Bauder .................. C22B 7/006
210/189

(Continued)

FOREIGN PATENT DOCUMENTS

CN 202 988 930 U 6/2013
CN 203 474 587 U 3/2014
(Continued)

OTHER PUBLICATIONS

International Search Report and Written Opinion of the International Searching Authority issued on May 7, 2020 in corresponding International application No. PCT/IB2019/061202; 10 pages.
(Continued)

*Primary Examiner* — Clare M Perrin
(74) *Attorney, Agent, or Firm* — Maier & Maier, PLLC

(57) ABSTRACT

A water reclamation system that includes a primary module with separation capabilities and a dirty water tank, a secondary module with a treatment tank, ozone generating capabilities, a recirculation circuit and a catalyst filter, a tertiary module with filtration capabilities, and a treated water tank. The system may also include a desalination module, a turbulence promoter inside the treatment tank and/or water electrical conductivity measuring elements for water electrical conductivity control in the treated water tank. The water reclamation system has overall measures smaller than 15 meters of length, 4 meters of width or 3 meters of height and the nominal design flow of water to be
(Continued)

treated is between 0.5 and 25 m3/h. A corresponding water treatment method is also provided.

29 Claims, 16 Drawing Sheets

(51) Int. Cl.
| | |
|---|---|
| C02F 1/00 | (2023.01) |
| C02F 1/28 | (2023.01) |
| C02F 1/44 | (2023.01) |
| C02F 1/78 | (2023.01) |
| B01D 39/16 | (2006.01) |
| B01D 39/20 | (2006.01) |
| C02F 1/38 | (2023.01) |
| C02F 103/30 | (2006.01) |

(52) U.S. Cl.
CPC .............. *C02F 1/441* (2013.01); *C02F 1/444* (2013.01); *C02F 1/78* (2013.01); *B01D 39/1623* (2013.01); *B01D 39/1646* (2013.01); *B01D 39/2055* (2013.01); *C02F 2103/30* (2013.01); *C02F 2303/02* (2013.01); *C02F 2305/023* (2013.01)

(56) References Cited

U.S. PATENT DOCUMENTS

| | | | | |
|---|---|---|---|---|
| 2013/0075335 | A1* | 3/2013 | Prakash | B01D 61/002 210/640 |
| 2013/0146521 | A1* | 6/2013 | Brozell | B01D 69/122 210/500.21 |
| 2013/0313191 | A1* | 11/2013 | Wolf | C02F 9/00 210/638 |
| 2014/0094975 | A1 | 4/2014 | Nielsen | |
| 2017/0088449 | A1* | 3/2017 | Cote | C02F 1/004 |
| 2017/0107137 | A1 | 4/2017 | Jung et al. | |
| 2018/0028978 | A1* | 2/2018 | Chen | B01D 61/145 |
| 2019/0224597 | A1* | 7/2019 | Harden | B01D 33/39 |

FOREIGN PATENT DOCUMENTS

| | | |
|---|---|---|
| DE | 603 19 803 T2 | 8/2009 |
| WO | 2014/145825 A1 | 9/2014 |

OTHER PUBLICATIONS

Ning et al., "Fate of volatile aromatic hydrocarbons in the wastewater from six textile dyeing wastewater treatment plants", Chemosphere 136 (2015) 50-55; 6 pages.

Muezzinoglu, "A study of volatile organic sulfur emissions causing urban odors", Chemosphere 51 (2003) 245-252; 8 pages.

Wu et al., "Sampling and analysis of volatile organics emitted from wastewater treatment plant and drain system of an Industrial science park", Analytica Chimica Acta 576 (2006) 100-111; 12 pages.

* cited by examiner

INDUSTRIAL WASTEWATER TREATMENT SYSTEM AND METHOD FOR GARMENT FINISHING, JEANS AND DENIM INDUSTRY

FIELD

The invention refers to the field of water reclamation and wastewater treatment. In particular refers to the field of finishing clothing by means of a laser, ozone or other more traditional techniques (enzymes, softening, desizing processes, dyeing and tinting among others), in particular for fabrics known as jeans, jeanswear or denim, and preferably to produce an appearance of premature aging and to simulate the appearance of used clothing which has become aged in a natural way, and relates to an industrial equipment developed to treat and reclaim wastewater generated from these processes in order to obtain a high-quality water which can be reused in such processes. The new system and method can also be applied to other fabrics as, for example knitted fabrics.

BACKGROUND

In the field of finishing of clothing, especially jeanswear, also known as denim or jeans, there are many processes involved, in which water, chemicals and other solids are wasted. Some systems for the reclaim of wastewater generated from processes in denim industry and garment finishing have been disclosed as, for example:

US2017107137A1—discloses RESOURCE REUSE-TYPE INDUSTRIAL WASTE WATER TREATMENT METHOD AND APPARATUS UTILIZING OXIDIZING AGENT GENERATED BY UTILIZING WASTE WATER. This invention relates to a resource-recycling type method and apparatus for treating industrial wastewater using an oxidizing agent produced from wastewater, wherein, in the treatment of industrial wastewater containing nitrogen compounds and refractory COD-causing pollutants, an oxidizing agent is autonomously produced using ammonia gas stripped from wastewater and is then added back to the wastewater, thus economically treating the wastewater without the need to purchase an expensive oxidizing agent. This wastewater treatment method, suitable for use in decreasing amounts of nitrogen pollutants (T-N), including ethanolamine compounds and ammonia nitrogen (NH3-N), and refractory COD-causing pollutants in industrial wastewater, includes: stripping ammonia from raw wastewater, producing an oxidizing agent via addition of sulfuric acid to the stripped ammonia, electrolysis and addition of sodium hydroxide, and performing chemical treatment by adding the produced oxidizing agent back to the raw wastewater from which ammonia was stripped, thus removing the nitrogen pollutants (T-N) and the refractory COD-causing pollutants, and the apparatus used to perform the wastewater treatment method is also provided.

WO2014145825A1—discloses METHOD AND SYSTEM FOR THE TREATMENT OF PRODUCED WATER AND FLUIDS WITH CHLORINE DIOXIDE FOR REUSE. Embodiments of the invention relate generally to methods and systems for treating aqueous systems associated with industrial wastewater applications, in particular gas and crude oil drilling, pumping and production, in order to reduce or eliminate contamination and allow the water that is treated to be reused, in particular, to be reused for hydraulic fracturing.

There are also known systems, consisting in an integrated ultrafiltration water purification device, comprising for example an integrated rack, an ultrafiltration membrane group, a water feed system, a water production system, a backwash system, an online cleaning and filtering device, a selective agent adding device and a control system, wherein the ultrafiltration membrane group comprises at least one ultrafiltration membrane pressure container with at least ten membrane filaments arranged on an inner plumb bob; the water feed system is communicated with raw water, is communicated with each ultrafiltration membrane pressure container, and is also communicated with the selective agent adding device and the online cleaning and filtering device in succession; the front and back ends of the water production system are communicated with each vertical ultrafiltration membrane pressure container and a water production tank respectively; the backwash system is communicated with backwash water and each vertical ultrafiltration membrane pressure container respectively; the control system is connected with other parts respectively. The integrated ultrafiltration water purification device disclosed by the invention is simple in structure, achieves general use and interchange of various membrane elements or pressure containers, is suitable for purification of various water qualities, is high in purification efficiency, and can effectively reduce the cost.

There are many costly problems and drawbacks associated with the utilization of conventional processes for treating the wastewater.

For example, Chinese Utility Model documents CN202988930U and CN203474587U describe water treatment systems for the textile industry, which comprise biofilters (biological aerated filters). Herein it is considered that the use of biofilters is not compatible with processing high volumes or flows of water in the textile industry, because the biofilters rely on the use of living organisms which require lengthy periods of time in order to properly clean the wastewater. Moreover, biofilters require frequent and costly maintenance, while they also require complex technical set-up for controlling the environmental parameters such as the temperature, because the living organisms of the biofilters tend to be very sensitive to said environmental parameters. Therefore, herein it is considered that the use of biofilters can be avoided, and the present application describes a system and a method that is compatible with avoiding the use of biofilters without compromising the performance of the system in terms of speed and quality. In fact, the present system can process particularly high flows and volumes of water in a cost effective manner.

Moreover, the present application aims to avoiding the use of complex physiochemical processes, such as heterogeneous catalysis for the conversion of carbon to $CO_2$ for treating the water, and examples of such methods can be found in the prior art. For example, patent document DE60319803T2 describes processes for the treatment of wastewater, wherein the processes make use of ruthenium and/or iridium catalyst particles in the presence of ozone. The use of catalyst particles for promoting the action of ozone via heterogeneous catalysis is a complex process that entails elevated costs and the need for introducing processes for removing the catalytic particles from the water after the catalytic reaction has taken place. The present invention does not rely on the use heterogeneous catalysis for the decomposition of organic contaminants by ozone.

SUMMARY

The present invention is accomplished in order to solve some of the deficiencies in the prior art. In accordance with the invention, there is provided a water reclamation system that comprises: [a] a primary module with separation means and a dirty water tank, [b] a secondary module with a treatment tank, ozone generating means, a recirculation circuit and a catalyst filter, [c] a tertiary module with filtration means, and [d] a treated water tank, preferably for use in the reclamation of graywater, industrial effluent and wastewater in denim industry and garment finishing.

It is contemplated that the water reclamation system of the present invention primarily concerns the textile industry and the latter's need for eliminating fibers and organic contaminants found in the water that has been used for treating or finishing textile materials or fabrics or garments. Moreover, the water reclamation system of the present invention aims at avoiding using biofilters which tend to produce unpleasant odors, and which are difficult and expensive to use, service, control and maintain, while they also entail a slow filtering process which is incompatible with the need in the textile industry for processing high volumes and high flows of wastewater. In view of the above, optionally and preferably the water reclamation system is a water reclamation system for the textile industry. Moreover, also in view of the above optionally and preferably in the water reclamation system any of the following conditions (a)-(l) applies:

(a) the separation means is a mechanical filtration system:
(b) the primary module is configured to receive wastewater provided to the water reclamation system;
(c) the mechanical filtration system is configured to remove particles from the wastewater thusly converting the latter to dirty water;
(d) the dirty water tank is connected to the mechanical filtration system and configured to receive from the latter dirty water;
(e) the treatment tank of the secondary module is connected to the primary module and configured to receive from the latter dirty water;
(f) the ozone generating means are connected to the treatment tank and configured to supply to the latter ozone for treating the dirty water in the treatment tank via the application of the ozone to the dirty water and the reaction of the latter with the ozone;
(g) the recirculation circuit is connected to the treatment tank and configured to continuously pump dirty water from and to the treatment tank forming a recirculation loop within the secondary module to promote therein the supply and mixing of ozone into the dirty water thusly promoting the reaction of ozone with the dirty water;
(h) the catalyst filter is configured to transform to oxygen any ozone that does not react with the dirty water in the treatment tank;
(i) the treatment tank is closed and sealed so that ozone application is made in a completely sealed enclosure;
(j) the tertiary module is connected to the secondary module and configured to receive from the latter dirty water that has been treated with ozone;
(k) the filtration means are configured to remove particles from the dirty water that has been treated with ozone, thusly converting the latter to treated water;
(l) the treated water tank is connected to the tertiary module and configured to receive from the latter the treated water.

Most preferably all of the aforementioned conditions (a)-(l) apply, and therefore according to the above a most preferred embodiment of the invention is a water reclamation system for the textile industry, that comprises: [a] a primary module (1) with separation means and a dirty water tank, [b] a secondary module with a treatment tank, ozone generating means, a recirculation circuit (34, 36) and a catalyst filter, [c] a tertiary module with filtration means, and [d] a treated water tank, wherein the separation means is a mechanical filtration system, and:

the primary module is configured to receive wastewater provided to the water reclamation system;
the mechanical filtration system is configured to remove particles from the wastewater thusly converting the latter to dirty water;
the dirty water tank is connected to the mechanical filtration system and configured to receive from the latter dirty water;
the treatment tank of the secondary module is connected to the primary module and configured to receive from the latter dirty water;
the ozone generating means are connected to the treatment tank and configured to supply to the latter ozone for treating the dirty water in the treatment tank via the application of the ozone to the dirty water and the reaction of the latter with the ozone;
the recirculation circuit is connected to the treatment tank and configured to continuously pump dirty water from and to the treatment tank forming a recirculation loop within the secondary module to promote therein the supply and mixing of ozone into the dirty water thusly promoting the reaction of ozone with the dirty water;
the catalyst filter is configured to transform to oxygen any ozone that does not react with the dirty water in the treatment tank;
the treatment tank is closed and sealed so that ozone application is made in a completely sealed enclosure;
the tertiary module is connected to the secondary module and configured to receive from the latter dirty water that has been treated with ozone;
the filtration means are configured to remove particles from the dirty water that has been treated with ozone, thusly converting the latter to treated water;
the treated water tank is connected to the tertiary module and configured to receive from the latter the treated water.

It is worth noting that certain important essential or optional features of the system additionally differentiate significantly the present invention from the prior art. For example, the present invention in its preferred embodiment mentioned above differs compared to prior art documents such as CN202988930U, CN203474587U and DE60319803T2, for several reasons some of which are the following:

The separation means is a mechanical filtration system and thus not a biofiltration system. This is a particularly important difference compared to CN202988930U, CN203474587U which disclose the use of biofilters. In conventional prior art biofilters are used because they are considered as important for removing organic contaminants from the water that needs to be cleaned and reused. Herein, it is considered that the use of biofilters is not compatible with processing high volumes or flows of water in the textile industry, because the biofilters rely on the use of living organisms which require lengthy periods of time in order to properly clean the wastewater. Moreover, biofilters require frequent and costly maintenance, while they also require complex technical set-up for controlling the environmental parameters such as the temperature, because the living organisms of the biofilters tend to be very sensitive to said environmental parameters. Therefore, the present invention solves the problem of how to avoid the use of biofilters without compromising the performance of the system in terms of speed and quality. In fact, the present system can process particularly high flows and volumes of water in a cost effective manner. Moreover, the present invention solves the problem of how to avoid use of complex physiochemical processes, such as heterogeneous catalysis for the conversion of carbon to $CO_2$ for treating the water. The use of catalyst particles for promoting the action of ozone via heterogeneous catalysis is a complex process that entails elevated costs and the need for introducing processes for removing the catalytic particles from the water after the catalytic reaction has taken place. The present invention does not rely on the use heterogeneous catalysis for the decomposition of organic contaminants by ozone.

The catalyst filter in the present invention is configured to destroy ozone i.e. transform non reacted ozone molecules to oxygen. This is an important feature related to the safety of the users of the system. This feature is also related to the controlled operation and the good predictability of the efficient operation of the system. Going against intuitive thinking which would guide an expert to avoid reducing the ozone concentration in the closed treatment tank, and thus to avoid destroying part of the ozone contained therein so that the ozone-induced effect and thus the water reclamation rate are maximized, the inventors have found that the presence of the catalytic filter for destroying non-reacted ozone is actually necessary and important. The presence of the catalytic filter is important for ensuring that the exact ozone concentration in the water is well controlled and optimized, and for ensuring that the ozone concentration within the water is sufficiently high for achieving a fast and efficient treatment of the water, but at the same time is not excessively high. When the ozone concentration is not excessively high, the system is safe and the tank of the system can be closed and sealed. Moreover, the present invention differs compared to the teachings of documents of the prior art that remain completely silent on the topic of destroying ozone with catalytic filters, and/or that teach that catalysts are used for enhancing the oxidation process via heterogeneous catalysis.

The recirculation circuit by being configured to continuously pump water to and from the treatment tank to promote the appropriate injection of ozone into system and the dirty water processed in the secondary module, also allows that the ozone concentration across the volume of the dirty water in the treatment tank is well controlled, so that it is aimed that there are no parts of said volume wherein the water is not adequately treated with ozone. This is a very important feature and its presence is technologically crucial for the case that the flow of water through the system is high, and that the speed at which the system needs to process and clean/reclaim the water are correspondingly high. Moreover, the recirculation circuit may recirculate within the tank dirty water that needs to be passed several times through the ozone containing tank and/or by or close to the point of entrance of the ozone gas into the secondary module (wherein ozone concentration may be particularly high), so that the organic contaminants of the contaminated/dirty water are decomposed by the ozone so that the water becomes adequately processed with ozone before being passed to the tertiary module. Therefore, the recirculation conduit differentiates significantly the present invention compared to the prior art documents which remain silent on the specific topic. It is further clarified that most preferably, the recirculation circuit has two ends each of which is connected/attached to a corresponding inlet/outlet in the treatment tank, with one end receiving from the treatment tank dirty water and with the other end passing to the treatment tank dirty water, thusly recirculating dirty water within the secondary module and through the recirculation loop therein. The recirculation circuit by recirculating water through the treatment tank, it agitates the water/ozone mixture within the tank and the secondary module and ensures that the wastewater is being mixed and sufficiently processed by the ozone gas, and it aids to the injection of the ozone gas into the dirty water.

The ozone treatment happens in a sealed environment. This is a particularly important feature that contributes to the high efficiency of the system and its ability to process very quickly and efficiently high volumes and flows of wastewater. If ozone treatment of water is not done in a sealed environment, then it may be necessary to avoid using high concentrations of ozone which would in turn lead to the need for decreasing the flow of wastewater through the system. Moreover, the sealed environment can contribute to the ability to avoid the use of biofilters and to avoid or to inhibit the growth of living organisms in the system as explained for the cases below.

The invention, especially in its most preferred embodiments, permits that in the system the use, presence and growth of living organisms from ambient air is avoided, as is explained further below. Therefore, optionally and preferably the water reclamation system does not comprise a biological filter (biofilter) nor a biological aerated filter. In that case, it is evident that the system of the present invention differs in a most significant and technologically crucial way from systems that are described in the prior art and comprise biological or biological aerated filters, as is the case for example with the systems described in CN202988930U and CN203474587U. It is worth noting that the prior art teaches the use of biofilters in water reclamation systems intended for use in the garment industry because said filters are deemed in the prior art to be essential for the efficient removal of textile-related organic contaminants such as dyes. Going against the teachings of the prior art, the inventors of the present invention found that unexpectantly the water in the textile processing industry can be very effectively reused without having to use biofilters, as long as the system of the present invention and the corresponding water treatment procedural steps are used.

It is therefore evident that in the system of the present invention, optionally and preferably the dirty water tank, the treatment tank and the treated water tank are closed and sealed tanks to avoid the presence and growth of living organisms from ambient air and the escape of unpleasant odors, gases or liquids from them.

Moreover, considering the above, optionally and preferably in the water reclamation system of the present invention the separation means are a mechanical filtration system. Moreover, it must be mentioned that mechanical filtration systems i.e. filters that remove contaminants from the water via mechanical processes rather than physicochemical or biological processes, have the general advantages of requiring less costly and less frequent maintenance, are able to process faster and without interruption high flows and volumes of water, and are more simple and less costly compared to other systems, such as compared to biological aerated filters, which may entail complex technical requirements and complex operational control such as temperature control etc. Moreover, compared to biological filters, mechanical filters and mechanical filtration systems are compatible with the use of sealed tanks so that dangerous and/or odorous gases and substances are not released to the outside.

Optionally and preferably the separation means are configured to remove from the water particles with a size greater or equal than 0.05 mm. This technical feature is important for achieving a sufficient subsequent treatment with ozone that should preferably be applied on water that does not contain particulates which are larger than 0.1 mm, because large particulates inhibit the homogeneous distribution and action of the ozone across the entire volume of the water in the treatment tank, and the surface of contaminants which are larger than 0.05 mm or 0.1 mm may also mediate undesired physicochemical reactions which may consume part of the ozone, thus preventing the latter from degrading the organic contaminants that must be destroyed in the system.

In the water reclamation system of the present invention optionally and preferably the filtration means are able to remove particles with a size greater or equal than 0.05 microns. This is particular important considering that in practice the system of the present invention is most preferably used in the garment/textile industry and in connection with textile material processing systems. In this case, the water reclamation system is preferably connected with the textile material processing systems in such way that the water reclaimed from the textile material processing system/s is supplied back to the same system/s, and so on. Therefore, the water filtered by the filtration means, after being send to a textile material processing system probably will eventually be passed again to the water reclamation system, and therefore will be passed again through the treatment tank where it will be treated with ozone. The inventors have found that for optimizing the ozone treatment process, it is important that the concentration of particulates with size greater than 0.05 microns is as small as possible. Therefore, it is important that the filtration means can preferably filter out such particles to thusly contribute indirectly to the good operation of the secondary module of the system.

It must also be noted that optionally and most preferably, in the water reclamation system of the present invention, the system is configured so that water passes successively through the primary module, the secondary module, the tertiary module and the treated water tank. This means that the primary module, the secondary module, the tertiary module and the treated water tank are respectively positioned within the system in a serial manner.

As used herein, the term "wastewater" includes any contaminated water from processes of denim industry and garment finishing, including soaping, bleaching, dyeing, softening, fixing, rinses and enzymatic washes among others. Thus, the treatment plant may be used to treat wastewaters contaminated with a wide range of pollutants, such as enzymes, sodium and calcium hypochlorite, dyes, softeners, salts, acids and bases.

As used herein, the term "graywater" includes any contaminated stream from processes of denim industry and garment finishing without polluted water from toilets or fecal contamination.

The water used by the garment washer, known as wastewater, is transferred to a graywater storage tank and from the graywater storage tank the wash water is transferred to the wash-water reclamation system of the invention. The wash-water reclamation system cleans the wash water and returns the treated water (also referred to as "cleaned water" or "clean" water) to the garment washer for reuse or sends the water to the treated water storage tank for later use by the garment washer. The wash-water reclamation system can be activated manually by the user or by a detection system in the water storage tank that detects when a predetermined amount of graywater has accumulated. The garment washer, wash-water reclamation system, and storage tank is a closed system where water is not lost. The wash-water reclamation system can be configured to remove soap, dye, bits of fabric such as microfibers, or other contaminants from the wash-water. After the wash-water is cleaned, the cleaned water is used by the garment washer to wash another load of garments.

Industrial ecology combines perpetually desirable outcomes in environment, economy and technology sustainably. In wastewater treatment, industrial ecology would mean that all so-called "waste" is re-input into the same or other process, forming continuous loops. The wash-water reclamation system according to the invention, considered as an industrial ecology system, has many advantages over other wastewater treatment plants and systems developed before, including the ability to be manufactured into a very compact size, its modularity, less volatile emissions due to the non-use of chemicals, and fully automation that leads to a simplification of the required management and the minimization of the need of manpower and maintenance. Its compact size can achieve the following dimensions in the worst-case scenario: 15 meters of length, 4 meters of width and 3 meters of height. Such dimensions are smaller than the large area of exploitation of conventional effluent or wastewater treatment plants, which need hundreds of meters in each dimension to accomplish its targets in terms of water quality. For instance, the Detroit wastewater treatment plant in USA has an area of exploitation of 0.53 $km^2$ or the Viikinmaki wastewater treatment in Finland has an area of approximately 0.1 $km^2$. In the same way, these conventional wastewater treatment plants cannot efficiently remove the specific pollutants generated in textile industry and garment finishing because they are heavily designed for removing other, well-known, contaminants. However, the implementation of separation techniques in the wash-water reclamation system according to the invention allows the reduction of space without affecting the removal efficiencies of the water-quality parameters affected by such pollutants, including settleable and suspended solids, color, chemical oxygen demand (COD) and biological oxygen demand (BOD). For this reason, the combination of physical and chemical treatments oriented to the non-use of chemicals makes the present wash-water reclamation system a sustainable industrial ecological alternative to the most common methods used in wastewater treatment.

The task of the operator is simplified mainly owing to the implementation of a fully-automatic water reclamation system, in which maintenance tasks and monitoring are minimized to merely control the good performance of the system (checking signals on a display), the filter replacements when is required and the solid waste disposal. As a consequence of this automation of technology, the need of manpower is reducing to one or two operators.

The new water reclamation system is an innovative technology which is able to treat water by combining oxidation techniques with refinement filtration technology, thus resulting in a noticeable reduction of time and space occupied in comparison to physicochemical and biological treatment systems.

The time reduction is remarkable given that the new water reclamation system according to the invention is capable of treating 1000 liters of contaminated water in an approximate time ranging between 15 or 20 minutes. This time has to be understood as the time that takes to gather these 1000 liters in the prefilter until it comes out to the clean water tank.

As regards volatile emissions, odorous volatile organic compounds, such as sulfur containing compounds, alkylhalides, aromatic amines or aliphatic hydrocarbons, are originated from aerobic and anaerobic decomposition of water contaminants present in wastewater and can be detected in influent, effluent or in ambient air of an effluent in a wastewater treatment plant or even in urban air, ignoring the importance of the untreated pollutants. In some cases, pollutants could be detected in excess in urban air, thus presenting higher concentration than the detection threshold of the human sense of smell. Problems with emissions of volatile organic compounds (both toxics and non-toxics) from wastewater treatment plants, including textile industry, in urban air have been reported by several researches during the last decades (Muezzinoglu, Chemosphere 51, 2003, 245-252; Wu et al., Analytica Chimica Acta 576, 2006, 100-111; Ning et al., Chemosphere 136, 2015, 50-55). Due to the preferred non-use of chemicals, the volatile emissions in the new water reclamation system are very limited to the organic concentration of the wastewater, which is reduced by the combination of ozonization and aeration that significantly remove the complex and long-chain organics (and some inorganic compounds such as sodium metabisulfite) up to their completely biodegradation. In the same way, the preferred use of closed and sealed tanks during both storage and treatments avoids the presence and growth of living organisms from ambient air and the escape of unpleasant odors, gases or liquids from them.

The invention also refers to a method for reusing the water involved in all the above-mentioned processes, which is able to overcome the aforementioned waste of water by reducing the final cost of the product mainly due to the reduction of time needed to treat water, and the space required to properly treat wastewater obtaining treated water with high-quality. In the same way, the method proposed here allows the simplification of the design of an effluent or wastewater treatment plant and the production process of reclaimed water.

The ozone application must be made in a completely sealed enclosure in order to prevent any leaks to come outside and to prevent any damage to the workers. Therefore, the secondary module includes a catalyst filter in the treatment tank (i.e., a filter with an ozone destroyer) with the aim that said catalyst transforms the residual non reacted ozone molecules in oxygen.

The ozone injection can be made in two different ways, one by a Venturi injector and another by means of air diffuser placed in the bottom of the treatment tank, being the Venturi injector the preferred solution.

Preferably there is a certain agitation of the water inside the treatment tank in order to improve the ozonition process. In this sense, preferably the treatment tank has a water inlet, which is positioned at a height between ¼ and ¾ of the total height of the treatment tank) and most preferably it is positioned in about the middle of the treatment tank. Alternatively or additionally the treatment tank has inside a turbulence promoter, that preferably is a layer of twisted helical elements.

In one aspect, the invention resides in a wastewater treatment system for denim industry and garment finishing, including:

oxidation processes used as the main chemical treatment based on ozonization to reduce chemical oxygen demand (COD) and biological oxygen demand (BOD).

separation techniques, preferably membrane technologies, which significantly increase the efficiency of removing the remaining solids, salts and organic compounds after ozonization and therefore, refine the quality of treated water.

Preferably, the separation means comprises a rotary drum filter and a rotative sieve. Advantageously, the rotary drum filter is able to remove particles with a size greater or equal than 0.5 mm and/or the rotative sieve is able to remove particles with a size greater or equal than 0.1 mm. In fact, the ozone treatment degrades the organic compounds into more simple ones, but does not fully eliminate them. Therefore, a precise separation, in particular of the textile fibers, has two advantages: it reduces the consumption of ozone, and it reduces the degraded particles that will be necessary to filter after the ozonization step. Additionally, the use of rotating filters (the rotary drum filter and/or the rotative sieve) have proved to be very efficient for removing large accumulations and/or agglomerations of fiber.

The tertiary module with the filtration means is one of the most relevant aspects of the present invention. As the treated water will be used again in the washing process of new garment, it has to fulfil strict quality parameters in order to not affect negatively the quality of washing process. In this sense, it has been observed that the presence of small accumulations of fibers and microfibers not only reduces the performance of the ozonization, as stated above, but also implies the contamination of the garment in the following washing processes with the reused water. Therefore, preferably the filtration means comprises a multimedia filter or a multibed filter in order to retain these small solids remaining in the water after the ozonization. Preferably, the multimedia filter is able to remove particles with a size greater or equal than 5 microns and preferably it comprises a bed of glass, a bed of zeolite and a bed of sand. The multimedia filter is also aimed at removing the complex salts and small solids from water, such as rests of stone or sludge.

The inventors have noted that the multimedia filter was very quickly filled or obstructed due to the amount of microfibers existing in the contaminated water. This is the reason why, preferably, the tertiary module includes self-cleaning system for the multimedia filter that uses treated water as cleaning agent. Normally, the filters which are used for removing solids have a dead-end or conventional configuration, where a liquid frontally collides with the filtering bed. The inventors have seen that this causes very quick obstructions of said filters. It is possible to install several multimedia filters in parallel in order to carry out the cleaning thereof without affecting the production, but this involves a higher expense. In the present invention, it has been implemented an automatic cleaning system in order that it does not affect the production and that better conditions are provided in each moment.

Alternatively or additionally, preferably the filtration means comprises a submerged membrane filtration system, which preferably has an average pore size comprised between 0.05 and 0.1 microns. The submerged membrane filtration system enables a large removal of organic and inorganic compounds by applying very low pressures and aeration for making difficult the contaminating solids to pass, degrading them due to the effect of said aeration and minimizing the dirt in the membrane caused by the created turbulence. In the case that the system also comprises a desalination step, the submerged membrane filtration system also helps to deliver to the desalination step a cleaner water, in particular without organic matter.

Advantageously, the submerged membrane filtration system has PVDF ultrafiltration membranes.

Preferably the filtration means comprises an activated carbon filter. So, contaminants that could provide colors and odors may be also eliminated from the treated water. It is also very useful for removing chlorine, chlorinated and organochlorine compounds In this sense, it is also advantageous that the water reclamation system according to the invention also comprises color control means for color control of water exiting the treatment tank.

Preferably the water reclamation system according to the invention also comprises [e] a desalination module. In fact, the inventors have discovered that there are two possible preferred strategies (desalination module in series or in parallel with the rest of the system) and two possible preferred technologies (reverse osmosis or membrane distillation that can be used for the water reclamation system according to the invention, for the removal of monovalent and divalent salts in the ozonized water. One of the criteria for selecting one or the other alternative is the size of the system (in the sense of the amount of water to be treated) So, one preferred solution is when the desalination module is connected to the treated water tank, receiving water to be desalinated from the treated water tank through a drain valve and a flow, where the drain valve and the flow are in parallel to a treated water flow that exits the water reclamation system (the desalination module is in parallel with the main water circuit of the system). In this case, preferably the desalination module comprises a membrane distillation system. This system needs a separate working circuit (the parallel circuit), but has as advantage that it generates a solid residue which could directly be poured without the need of an expensive management or, even, without the need of being managed. Preferably the water reclamation system further comprises water electrical conductivity measuring means for water electrical conductivity control of water in the treated water tank and means for diverting water from the treated water tank to the desalination module if if water electrical conductivity is over a pre-established value.

The other preferred solution is when the desalination module is connected in series between the filtration means and the treated water tank, where the only inlet of water of the treated water tank is salt-free water coming from the desalination module. In this case, preferably the desalination module comprises a reverse osmosis system. This system is widely known in the industry and has a high acceptance in the water treatment. The problem related thereto is the generation of a rejection flow (charged with salts) which must be returned to the system. The big advantage of this system is the performance thereof. Advantageously, the desalination module has a high-pressure pump that feeds filtered water into the reverse osmosis system, where the high-pressure pump has a maximum nominal pressure lower or equal than 20 bar.

As one of the objectives of the present invention is a sustainable system capable of treating water, preferably each and all the drainages are recovered and are sent to the dirty water tank.

As another objective of the present invention is an automated equipment, the drainage systems are all automated to discharge after a certain period of time or a number of cycles in order to alleviate the system from the contamination formed in different steps of the treatment.

Another of the objectives of the present invention is a system compact in size. This is achieved by a specific combination of sizes and layout that make the system flexible and optimally sized. So, preferably:

the ratio between the volume of the treatment tank and the volume of the dirty water tank is between ⅕ and ½, and more preferably between ¼ and ⅜.

the ratio between the volume of the dirty water tank and the volume of the treated water tank is between ¼ and 1, and more preferably between ⅓ and ⅘.

the system has an overflow flow conducting water from the treated water tank to the submerged membrane filtration system.

the system has an overflow flow conducting water from the submerged membrane filtration system to the dirty water tank.

the system has an overflow flow conducting water from the treatment tank to the dirty water tank. This connection can also be used as an ozone outlet that allows injecting the non-reacted ozone from the treatment tank into the dirty water tank.

This invention has particular, but not exclusive, application to so-called "water-mining" plants for treating wastewater and graywater. However, the invention could also be used as an "end-of-pipe" facility.

The term "water-mining" refers to an approach to wastewater treatment which is fundamentally different to conventional water treatments. Traditionally, wastewater has been reticulated from its source to a distant "end-of-pipe" treatment plant whereat the graywater and wastewater is treated and separated into a number of by-products.

In another aspect, the invention resides in the development of a fully automatic, complete and compact wastewater treatment system that does not need the presence of skilled manpower to properly operate.

This purpose is preferably achieved by means of a method for wastewater treating of clothing of the type indicated above, characterized in that said function is consisting of a combination of physical and chemical treatments based on the complete use of separation technologies including:

a) mechanically physical treatment based on rotating filtration to remove the largest and thickest solids including fiber agglomerations and aggregations and the remaining stones from stone washings. These solids have large sizes ranging from 0.1 mm to several millimeters in diameter. For this reason, the installed filtration system should present a mesh size lower than these solid particles to avoid them to pass through the subsequent steps. The first rotating filter has a variable mesh size between 0.5 to 2 mm that permits small solids to pass through its mesh sieve. Then, these small solids would be retained on a 0.1 mm rotating round-meshed sieve (a second rotating filter). The selected mesh sizes are chosen due to the need of obtaining a constant high flow during operation. This configuration permits the system to protect the pump from such residues in order to prolong its lifespan and also to reduce its pollutant load and to improve the performance of subsequent treatments.

b) pressure-controlled oxidation processes in a closed and sealed tank by using ozone to chemically degrade large and long-chain organic contaminants which are break down into less harmful and smaller molecules with a more hydrophilic and biodegradability.

c) a refinement filtration system to remarkably eliminate such smaller molecules, organic and inorganic macromolecules, remaining fibers and, especially, bacteria and viruses by combining multibed or multimedia filtration, membrane technology and adsorption processes. This system is divided into three different steps:
   filtration using a multibed, multilayered or multimedia filter consisting of well-differentiated filter beds made up of glass, a zeolite based on aluminum silicate and sand. The purpose of this filtration step is to protect the last treatment step and to clarify the water by removing turbidity and suspended solids with a size larger than 5 microns, and thus completely removing the garment microfibers.
   a submerged membrane system formed by polyvinylidene fluoride (PVDF) membranes with a pore size ranging 0.05 to 0.1 microns (thus belonging to microfiltration or ultrafiltration depending on their pore size) that permits the removal of small solids and particles by applying very low pressures, thus leading to high water fluxes with low energy consumption.
   an activated carbon filter (that may be granular or powdered activated carbon beds) to adsorb the remaining contaminants that could provide odor or color to the treated water obtained after passing the wash-water reclamation system.
d) optionally, a desalination system based on membrane technologies designed to remove the increasing electrical conductivity of the system and works independently from the oxidative treatment step to achieve the optimal water to be reintroduced in the washing machines. According to the design flow and volume requirements, different existing configurations can be applied as a desalination step and differ in their implementation. For smaller volumes, a parallel desalination step consisting of membrane distillation process is a good option to remove the excessive salt content in treated water without comprising the main reclamation system. Nevertheless, for larger volumes and higher design flow requirements, the implementation of nanofiltration/reverse osmosis system after the refinement treatment allows the water reclamation system to achieve the desired removal of salt content and to maintain the overall production of treated water.

The invention also refers to a machine for industrial wastewater treatment of garment of the type indicated above, characterized in that it further comprises control means designed to carry out the method described above.

The invention also comprises other detailed characteristics illustrated in the detailed specification of one embodiment of the invention and the accompanying figures.

BRIEF DESCRIPTION OF THE DRAWINGS

The advantages and characteristics of the invention will be more apparent from the following description which, without limiting main claim, explains certain preferred embodiments of the invention, referring to the figures.

DETAILED DESCRIPTION OF THE EMBODIMENTS

Figure 1A:
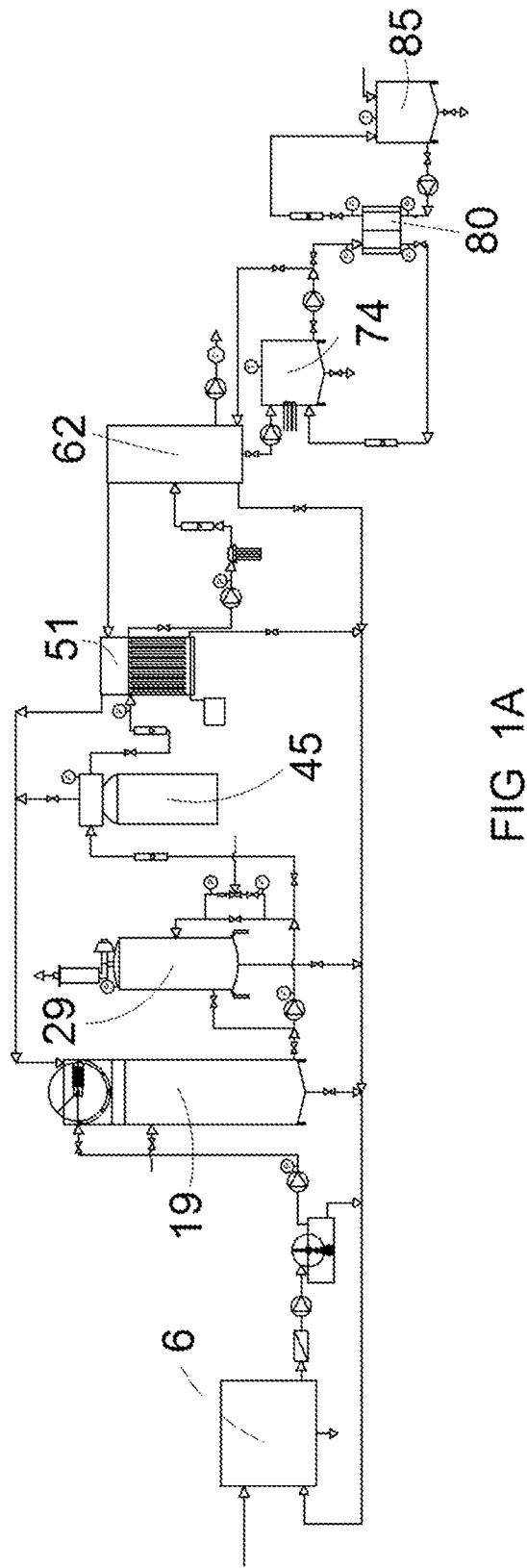
FIG. 1A is a schematic diagram of a first embodiment of a water reclamation system according to the invention, illustrating each specific part of the process, for small volumes and low design flow requirements.
Figure 1B:
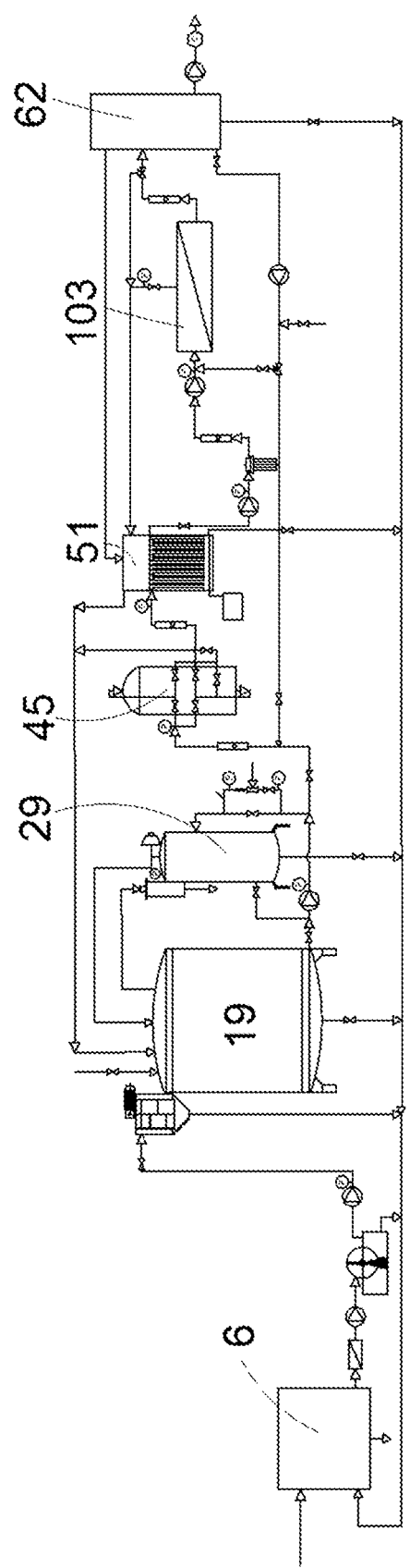
FIG. 1B is a schematic diagram of a second embodiment of a water reclamation system according to the invention, for large volumes and medium to high design flow requirements, illustrating each specific part of the process.
Figure 2A:
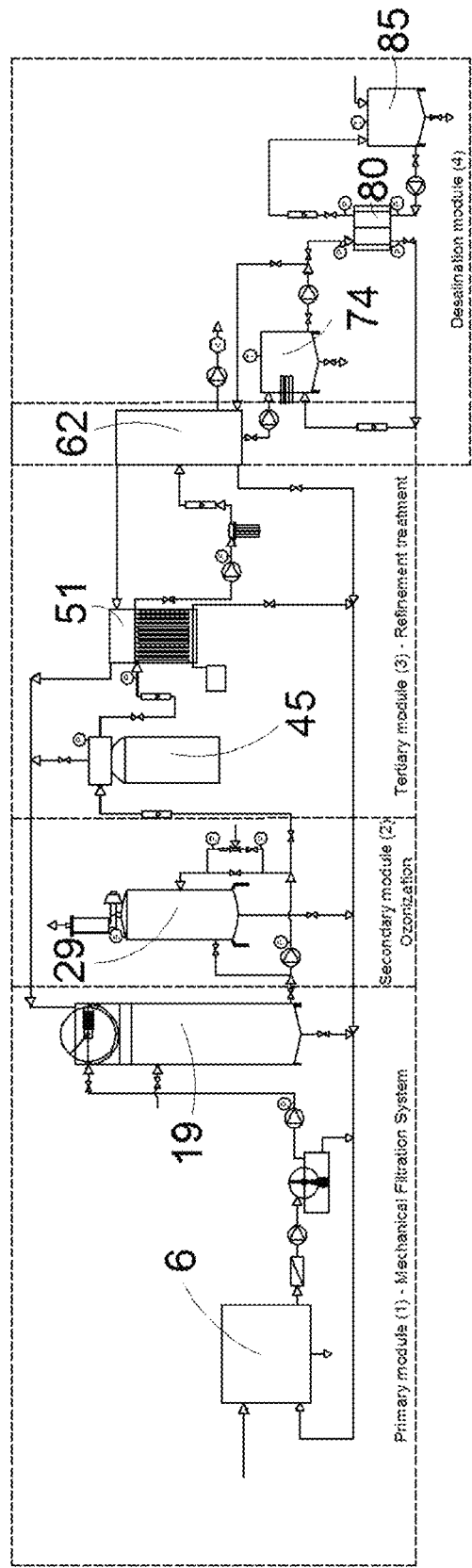
FIG. 2A depicts the first embodiment of FIG. 1A with the different modules that form the system.
Figure 2B:
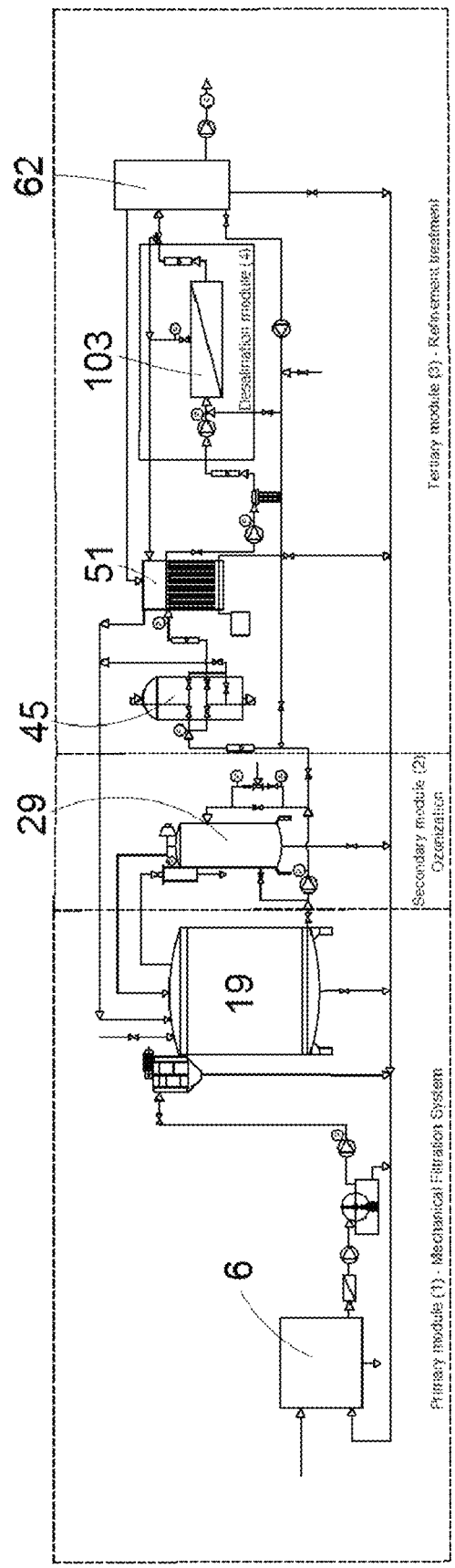
FIG. 2B shows the second embodiment of FIG. 1B with the different modules that form the system.
Figure 3A:
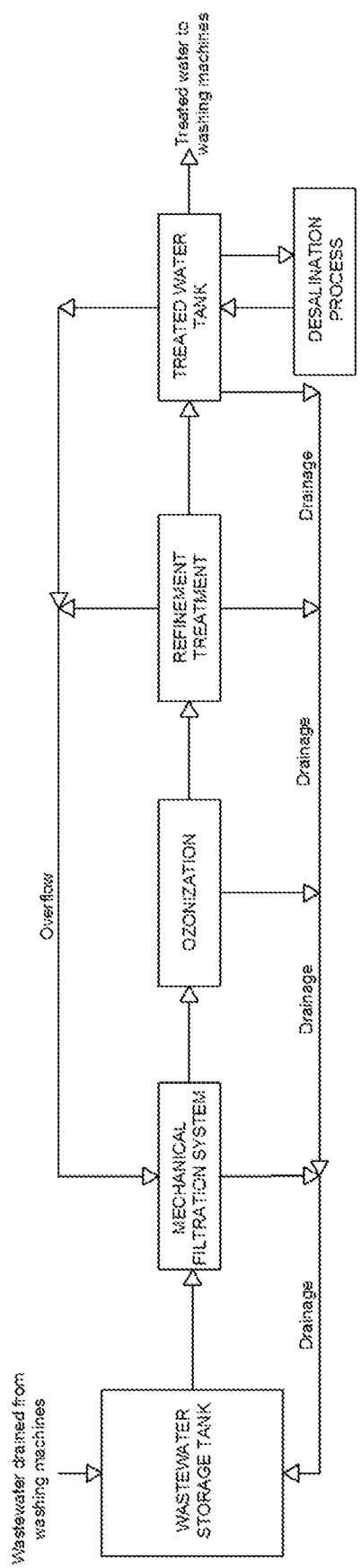
FIG. 3A is a system block diagram of the first embodiment of FIG. 1A with the method followed in treating wastewater to be reclaimed and reused in textile industry and garment finishing when small volumes and low design flows are required.
Figure 3B:
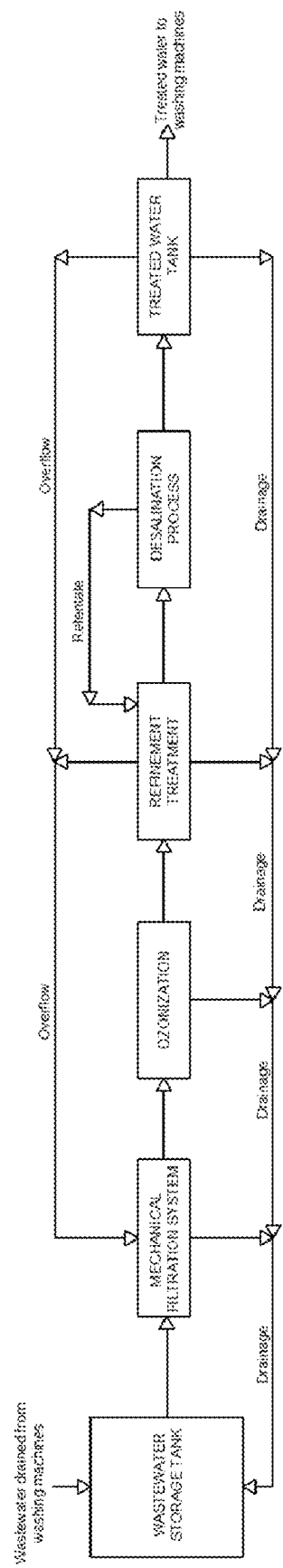
FIG. 3B depicts a system block diagram of the second embodiment of FIG. 1B with the method followed in treating wastewater to be reclaimed and reused in textile industry and garment finishing when large volumes and both medium and high design flows are required.

The water reclamation system will be next described in detail with reference to the annexed drawings. FIGS. 1A and 1B show two examples of embodiments of the overall water reclamation system along with attendant equipment including pumps, tanks, valves and manometers, among others, where the main differences are remarked in the volumes of tanks (which depend on the design flow requirements) and the desalination module (described below). Both system embodiments mainly consist of a pre-filter 11, a rotative sieve 16, a dirty water tank 19, a treatment tank 29, a multimedia filter 45, a submerged membrane filtration system 51, an activated carbon adsorption 60, a treated water tank 62, and a membrane desalination system. In the description that follows, the aforementioned treatment systems can be divided into three different modules which can be compared to a conventional wastewater treatment and an additional module employed to remove the excess of salt content in the treated water. FIG. 2A illustrates the schematic view of the water reclamation system with the different sections or modules which provide cohesion to the treating method for smaller volumes and lower design flow requirements. FIG. 2B shows the version of the wash-water reclamation system for larger volumes and design flow requirements, which presents some variations in comparison to the reclamation system for smaller volumes depicted in FIG. 2A, especially in the tertiary and quaternary (or desalination) module. The wash-water reclamation system has been developed with different dimensions to achieve design flow requirements between 0.5 to 25 $m^3/h$. FIGS. 3A y B depict the treating method described by a flow diagram, where the desalination process changes depending on the volume and design flow requirements of the system, being implemented as a parallel step in smaller volumes (defined in design flows between 0.5 to 2 $m^3/h$) and as a part of the production system for larger volumes (defined in design flows from 2 to 25 $m^3/h$).

The primary module 1 involves the uptake of wastewater by removing the large and thickest solids of the system by screening, filtering and sieving. These steps focused on removing unwanted solid impurities are very important to improve the quality of the polluted water that is pumped to the secondary module.

The secondary treatment or ozonization 2 is strictly focused on chemically breaking down the contaminants present in wastewater into simpler, less harmful, more hydrophilic and biodegradable compounds. Ozone is generated in-situ from oxygen and its use occurs in a pressurized tank at controlled operating conditions (temperature and pressure) to guarantee the oxidation of materials.

The tertiary module 3 is focused on refining wastewater treatment by using filtration processes, involving filtration by many different filter beds in a multilayered or multimedia filter, membrane separation processes and adsorption.

One fourth module known as desalination process 4 is added to ensure the reduction of salt content and electrical conductivity present in the treated water by implementing membrane desalination technology, such as reverse osmosis or membrane distillation processes.

Figure 4A:
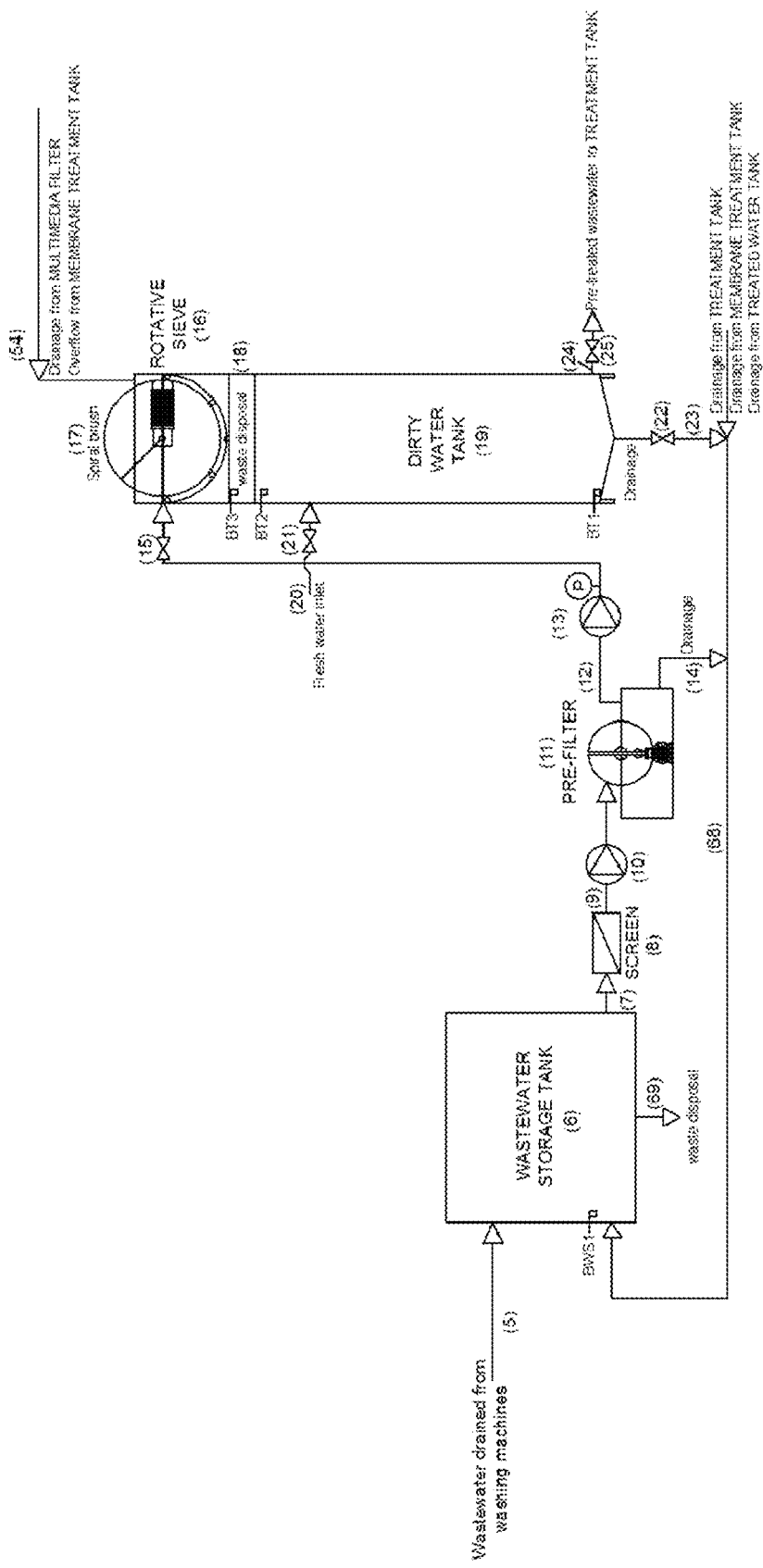
FIG. 4A is a schematic view of the primary module or treatment of FIG. 2A, where the mechanical filtration system formed by the pre-filter and rotative sieve and all the supplementary equipment necessary to ensure their proper operation is shown.

As shown in FIG. 4A, the primary module 1 consists of a screen 8, a pre-filter 11 and a rotative sieve 16 with all the supplementary equipment necessary to ensure their proper operation. After being used in washing machines water with some contaminants added during washing processes 5 is drained to a wastewater storage tank 6 where it is accumulated until reaching a certain level BWS1, thus automatically starting the wastewater treatment system up.

Wastewater flow 7 is screening by passing through a large mesh (henceforth screen 8) to protect the circulation pump 10. This screen 8 is designed to retain undesirable solids that could negatively affect the performance of the pump itself 10. The remaining wastewater 9 is pumped to the rotary drum filter (henceforth pre-filter 11), where the unwanted, thickest and largest solids (ranging from 0.5 mm to several millimeters in diameter) are retained by mechanical filtration. This pre-filter 11 is made up of, but not limited to, 304 stainless steel and should have a variable mesh size of about 0.5 to 2 mm to guarantee high solid retention. Likewise, large fiber agglomerations are also rejected with this pre-filter 11, which generates two different flows, where one wastewater flow 12 is pumped (by using a centrifugal pump 13 to provide the sufficient flow and pressure) into the rotative sieve 16, and the other generated contaminated flow 14 is drained to the wastewater storage tank 6. In addition, the pre-filter 11 is employed to protect the centrifugal pump 13 and to prolong its lifespan.

Figure 4B:
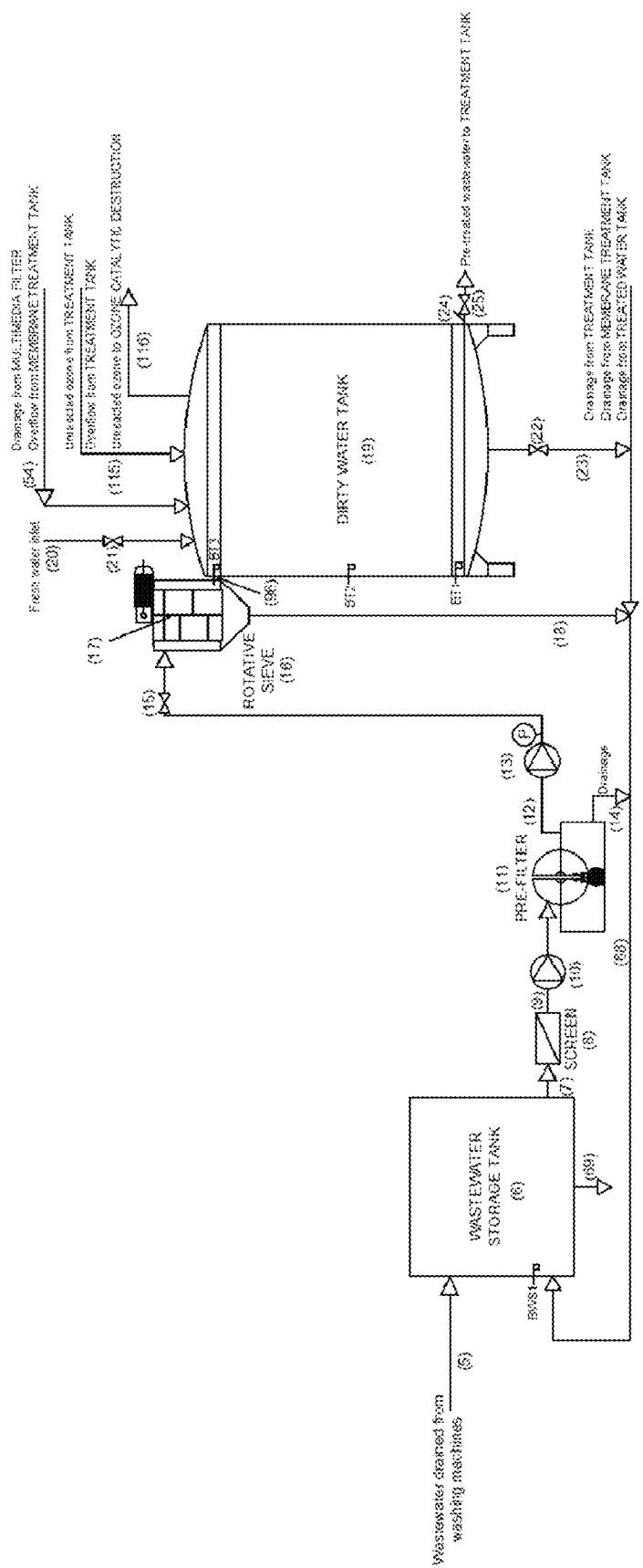
FIG. 4B corresponds to the schematic view of the primary module of FIG. 2B, where the mechanical filtration system formed by the pre-filter and rotative sieve and all the supplementary equipment necessary to ensure their proper operation is shown.

The entrance of water into the rotative sieve 16 is controlled by a pneumatic directional control valve 15. The rotative sieve 16 (mechanical rotary sieve or rotating round-meshed sieve) occurs in one step and involves the size exclusion or sieving mechanism to separate small solids larger than 0.1 mm to protect the main pump 26 and to improve the performance of the oxidation process which will be carried out inside the treatment tank 29. It is also aimed to reduce the pollutant load of wastewater by rejecting small solids that can hinder the effect of ozone on the wastewater, to maintain a constant high flow during operation, and to improve subsequent physicochemical treatments with this mechanical filtration. This rotative sieve 16 is also made up, but not limited to, 304 stainless steel. Alternatively, materials composing both the pre-filter 11 and rotative sieve 16 should resist the attack of different chemicals often used in textile industry and garment finishing, such as sodium and calcium hypochlorite, organic solvents, oxidizing agents, bases, salts, acids and organic compounds such as soaps, enzymes, softeners or desizing agents, among others. The rotative sieve 16 has a spiral brush 17 in order to remove the retained solids on the macroporous surface of the rotative sieve 16 without reducing the wastewater flow 12 that circulates into the dirty water tank 19. These retained solids are deposited in a waste disposal site 18 to be manually removed. Likewise, the wash-water reclamation system for larger volumes and design flow requirements, depicted in FIG. 4B, presents the same configuration but different geometry. In this case, the liquid waste formed by the retained solids on the surface of the rotative sieve 16 flows to the general drain 68 (explained below), which is send it to the wastewater storage tank 6 to be treated.

The dirty water tank 19 is a closed and sealed tank constructed of 316 stainless steel with a total volume ranging from 800 to 10000 liters, depending on the design flow requirements, as can be seen in FIG. 4A and FIG. 4B for smaller (800 to 1500 liters) and larger (1500 to 10000 liters) design flows, respectively. As was indicated before in the case of the pre-filter 11 and rotative sieve 16, the materials that make up the dirty water tank 19 should resist the attack of the different chemicals used in textile industry and garment finishing. It has three levels: minimum BT1, optimal BT2 and maximum level BT3. The system automatically fills the dirty water tank 19 until reaching the maximum level BT3. When water level falls to lower levels than BT2, the system starts over the filling process with wastewater from the previous stages of the wash-water reclamation system until reaching again BT3 and the system stops the pump 13, indicating that the filling process is carried out in a controlled and continuous manner. In cases where there is no wastewater to treat but the system is demanding untreated water to be treated, a fresh water inlet 20 and a control valve 21 are installed at the top of the dirty water tank to provide enough water for the system to continue. A drain valve 22 is located at the bottom of the tank and automatically opens the drainage 23 in regular and controlled intervals to reduce the solid content inside the dirty water tank 19.

Figure 5A:
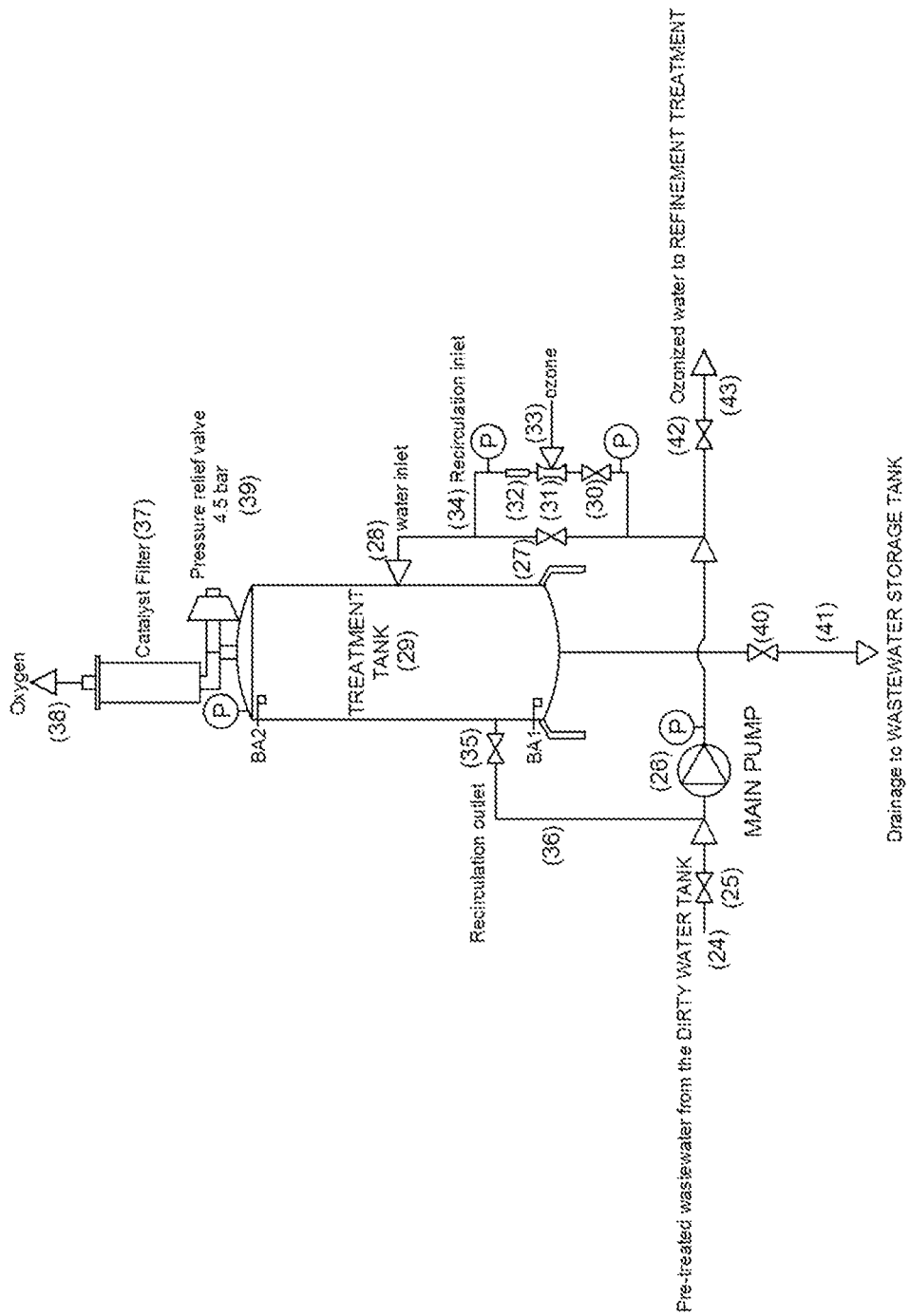
FIG. 5A is a schematic view of the secondary treatment of FIG. 2A, where the oxidation process is applied illustrating the injection system, recirculation loop and the different streams formed during the process.
Figure 5B:
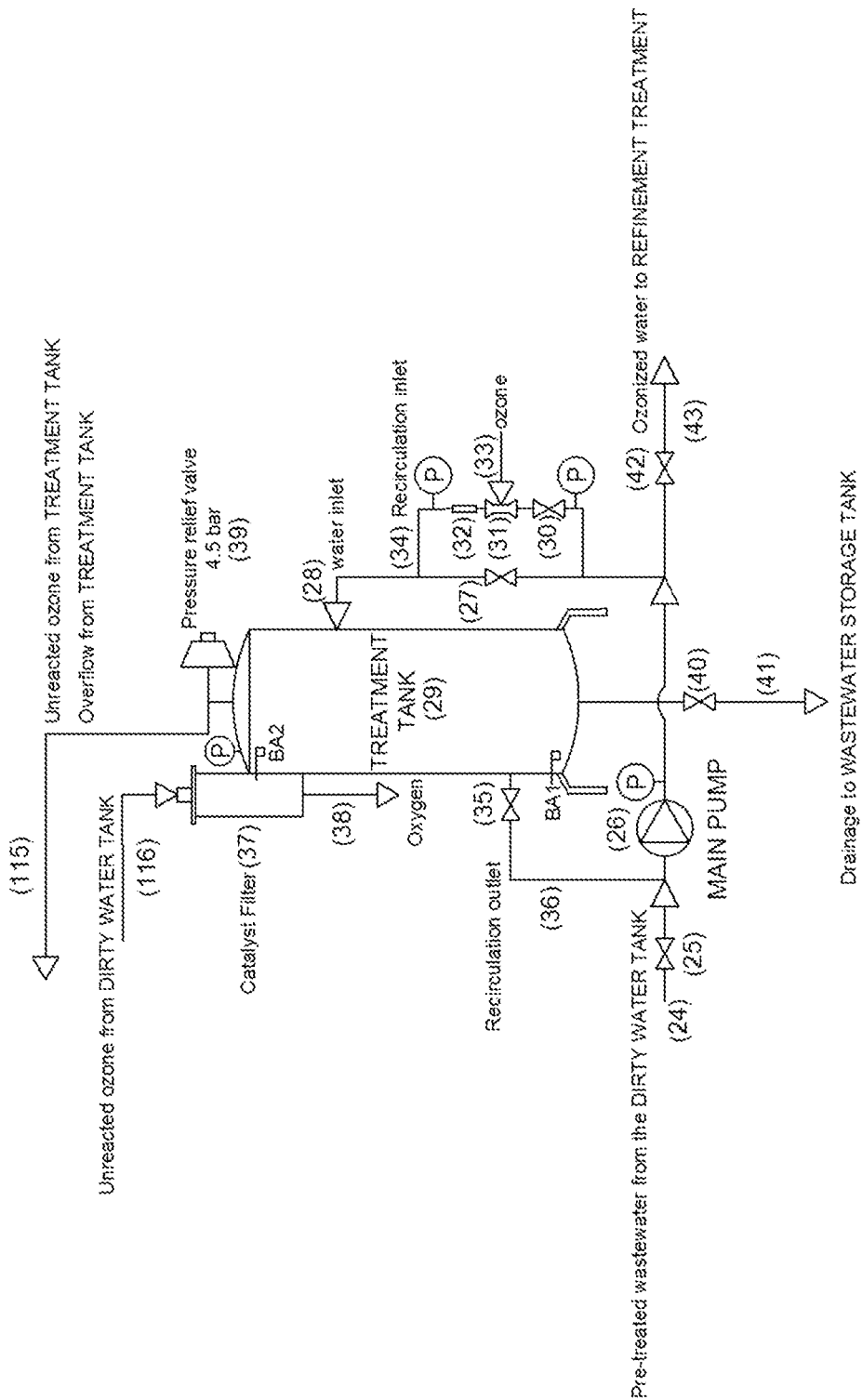
FIG. 5B is a schematic view of the secondary treatment of FIG. 2B, where the different elements to perform a proper oxidation process are represented.
Figure 8:
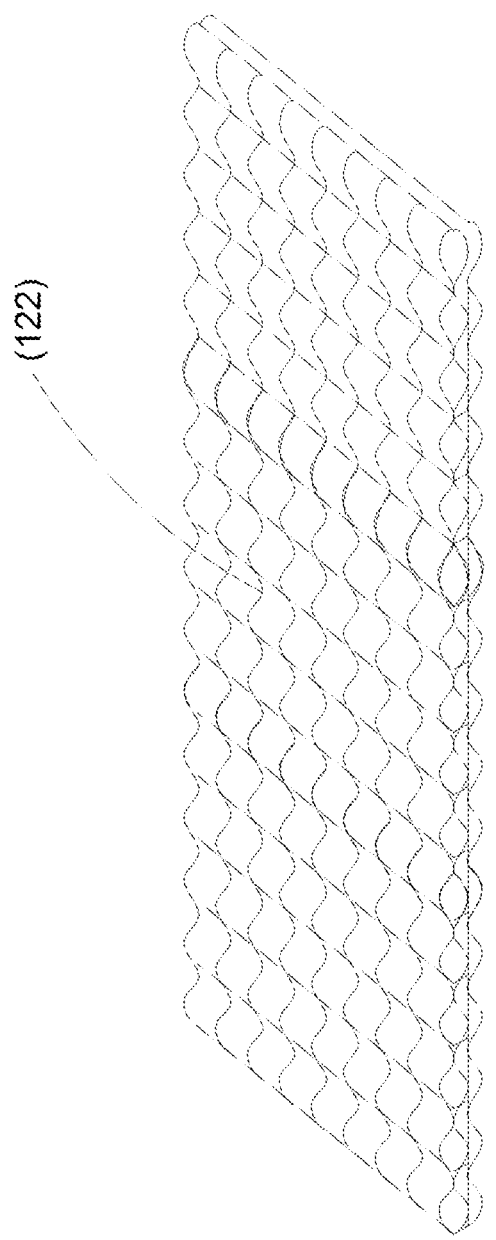
FIG. 8 is a perspective view of a turbulence promoter.

FIG. 5A illustrates the secondary module where the oxidation process is applied, depicting the injection system and the recirculation loop. After opening automatically both pneumatic control valves 25 and 27, the entering flow 24 from the dirty water tank 19 is transferred into the treatment tank 29 by the action of the main pump 26, obtaining the water inlet 28. The water inlet 28 can be located at any point of the treatment tank 29, but it is advisable to locate it at the central part of the deposit to guarantee an appropriate mix of water and ozone. The treatment tank 29 is constructed of, but not limited to, 316 stainless steel with a total volume ranging from 300 to 2500 liters, according to the design flow requirements. The volume of this tank is designed with the purpose of completely ozonizing the target water and removing the highest organic content in less than 6 minutes of treatment to satisfy production and quality requirements. The material of treatment tank could be any material (other type of stainless steel, stainless steel with PVDF or PTFE coating, etc.) that resists the oxidizing effect of ozone and the radical groups (like ·OH, $HO_2$· and ·$O_2$) generated during ozonization. Likewise, its thickness should be appropriate for resisting the resulting pressure gradients of this ozone treatment. In addition, a single metallic layer of twisted helical elements is placed inside this treatment tank 29 and is used as a turbulence promoter 122 mesh in order to work in a turbulent flow regime, which improves the mass transfer and hydrodynamic conditions (see FIG. 8). During ozonization, the presence of a turbulence promoter 122 mesh in the treatment tank increases the flow instability, thus limiting the foam generation during ozone reaction, and favoring the recirculation of wastewater and the oxidizing action of ozone over organic contaminants by mixing it completely with the untreated water. Several turbulence promoter 122 meshes can be used to replace the selected metallic layer of twisted helical elements with very similar results, including square bar, cylinder bars, smooth rods, and woven spacers, among others, which have been successfully tested. Besides geometry, the size and length of the turbulence promoter 122 are relevant to improve the removal efficiencies with ozone, where the dimensions of the selected turbulence promoter 122 mesh are preferably the diameter of the treatment tank in length, 70-75% of the height of the treatment tank in height, and 0.6 cm in width. This filling operation is continuously executed until reaching the upper level BA2, when the operation stops and the ozonization starts with a 2-second delay (closing valves 25 and 27 and opening valves 30 and 35, respectively). Ozonization 2 chemically degrades the contaminants present in wastewater, which are broken down into simpler, less harmful, more hydrophilic and biodegradable compounds. Ozonization 2 takes place into the treatment tank 29 where ozone gas 33 is added into water through the use of a venturi injector 31. Combined flow 34, which consists of a mixture of water and ozone, passes through a static mixer 32 and is transferred into the treatment tank 29, while combined flow 36 is made up water and residual ozone that cannot react during the process. Both combined flows (34 and 36) define a recirculation loop that is continuously pumped to and from the treatment tank 29 to ensure both the reaction of ozone with contaminated water and the appropriate injection of ozone into the wastewater treatment system. When ozone is applied into the system, the existing pressure drop is controlled by two manometers P located at the combined flow 34, which are used for evaluating the performance of the venturi injector 31. The programmable automaton monitors the operating time of both ozone injection and recirculation as well as the injected ozone concentration. In order to destroy the ozone gas that cannot react with water, a ceramic catalyst filter 37 is placed at the top of the treatment tank 29. A metallic catalyst filter can be also used as ozone destroyer. For this purpose, the filter holder material should be an ozone resistant material, such as specific stainless steel alloys, PTFE, glass or many other materials. This catalytic destruction of ozone results in the formation of oxygen 38, which is released to the environment. A pressure relief valve 39 is installed at the top of the treatment tank 29 to avoid overpressure. When the operating pressure exceeds 4.5 bar, this valve 39 is activated, the wastewater treatment system stops to work, and the programmable automaton warns the user by using an acoustic signal. There are other alarms implemented in the automaton like overheating, pump failure, inverter, breaker or ozone generator alarm, which help the operator to know what kind of drawbacks can occur and the cause of the appeared problem. For the variation of the system prepared for larger volumes (FIG. 5B), treatment tank 29 shows a different configuration at its upper part. The ozone outlet 115 flows from the treatment tank 29 to the sealed dirty water tank 19, where the residual ozone reacts with the accumulated untreated water located within this tank. The remaining ozone 116 is then destroyed by the ceramic catalyst filter 37, thus forming oxygen 38 in this decomposition reaction. The ozone outlet 115 can be used also as an overflow flow from the treatment tank 29 to the dirty water tank 19.

When ozonization 2 has finished, pneumatic valve 30 is immediately closed, while valves 35 and 42 are automatically opened. The main pump 26 works until reducing the volume level of the treatment tank 29 to BA1 level. When this BA1 level is reached, the filling process of the treatment tank 29 automatically starts again.

A drain valve 40 is located at the bottom of the treatment tank 29 and automatically opens the drainage 41 in regular and controlled intervals to reduce the solid content inside the treatment tank 29.

Figure 6A:
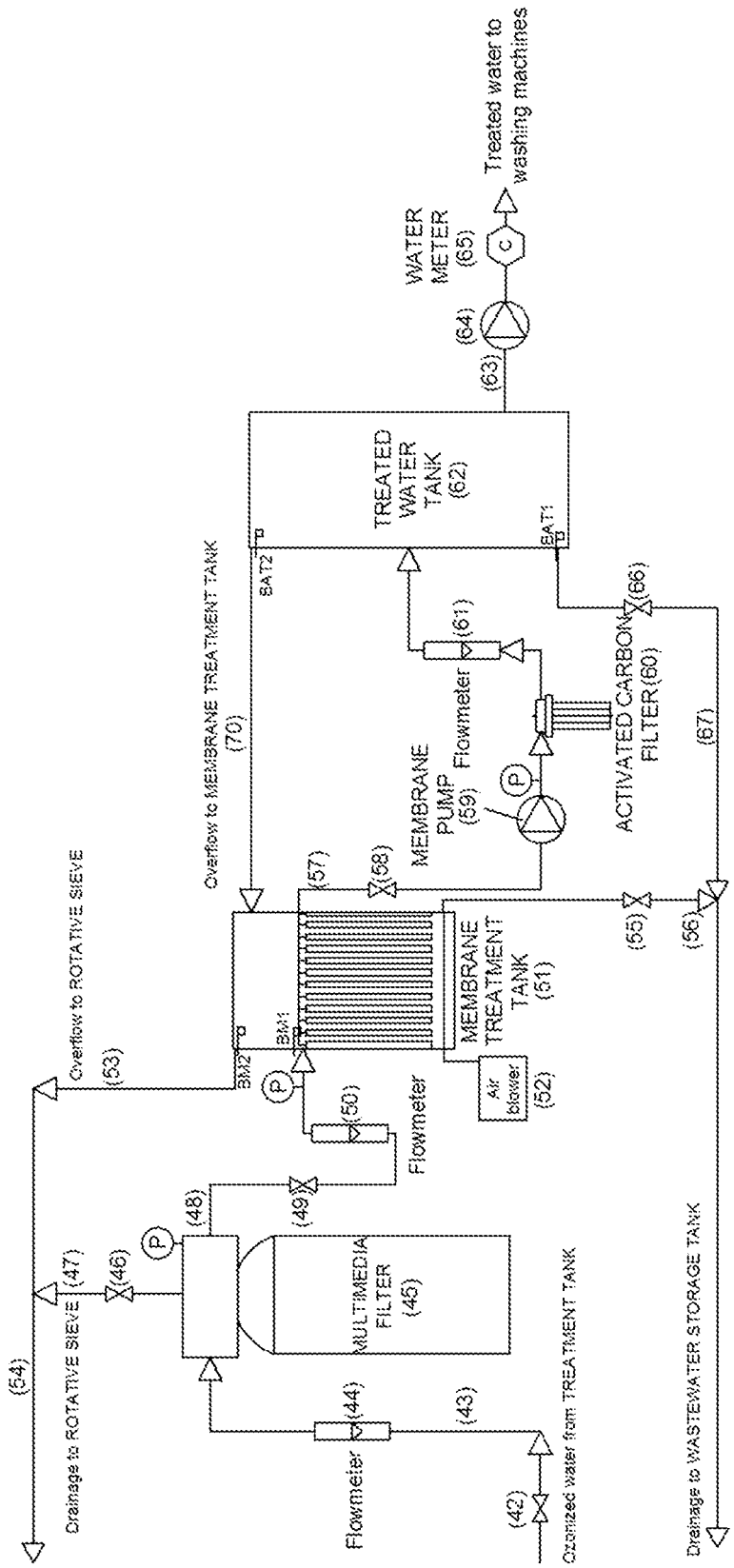
FIG. 6A is a schematic display of the tertiary module or treatment of FIG. 2A, where the refinement treatment takes place illustrating the filtration separation and the flows generated during operation.

FIG. 6A depicts a scheme of the tertiary or refinement treatment for small volumes and design flow requirements, illustrating the separation processes, such as filtration (multimedia filtration and membrane technology) and activated carbon adsorption (optional step depending on the water quality sought), employed to obtain a high-quality treated water to be reused again in the wash-water reclamation system. With these conditions, treated flow 43 is pumped to a multimedia filter 45 passing through a flowmeter 44 to control both the flowrate and color of treated water. The multimedia filter 45 clarifies the treated water by removing small suspended and dissolved solids with a size larger than 5 μm. Garment microfibers are therefore completely removed, thus ensuring a good level of cleanliness. Multimedia filter 45 consists of three well-differentiated filter beds of glass, zeolite (based on aluminum silicate) and sand. Alternatively, different layers of the same filter material (such as glass or sand with different sizes and porosities) can be also used as filter beds in its stead. The retained solids are removed from the multimedia filter 45 by programmable washings which are automatically activated when the differential pressure control is exceeded, after a specific number of filtration cycles or depending on a defined time indicated in the programmable automaton (values defined by the user). In this case, drain valve 46 is automatically opened and the formed contaminated flow 47 is returned to the rotative sieve 16 to be treated again. Multimedia filter 45 may be periodically washed. In order to not interfere with the production of treated water, washings are executed during ozonization and their duration should be lower than the ozone injection time. The contaminated flow 47 is mainly composed of agglomerations and aggregations of small fibers that pass through the previous treatments (prefilter 11 and rotative sieve 16). In larger versions of the system which correspond to the wash-water reclamation system depicted in FIG. 6B, the valve configuration to execute both filtration and programmable washings has been improved and programmed to achieve the best performance in the least space. During operation, valves 97 and 49 are normally opened, while 98, 99 and 100 are closed. When washing mode is activated, valve 49 is closed and valves 98, 99 and 100 are opened in these conditions to eliminate pipeline water hammer. This operation will be performed after backwashing and rinsing processes. After the anti-water hammer sequence, valve 97, 49 and 100 are closed, while valves 98 and 99 are opened. During this configuration, ozonization 2 is being carried out and secondary treatment 2 is not sending water to this tertiary module 3. Water for cleaning 108 flows from the bottom to the top of the multimedia filter 45, thus performing a backwashing of the filter and removing the solids that plugged and clogged the filter beds. To obtain the water flow 108, a valve 107 is installed at the bottom of the treated water tank 62 to be automatically opened when washing starts and water flow 108 is pumped using the centrifugal pump 109 and an opened control valve 119. After backwashing and a second anti-water hammer sequence, an automatic rinse is performed to remove the suspended fibers present inside the multimedia filter 45. During the rinsing operation, control valves 97 and 100 are opened whereas the rest control valves in the multimedia filter 45 are closed. When rinsing and the last anti-water hammer sequence have finished properly, normal operation is restored. The duration of each step (anti-water hammer sequences, backwashing and rinsing) can be programmed by user and are controlled by the programmable automaton.

Filtered water flow 48 that has passed through the multimedia filter 45 and the control valve 49 passes through the flowmeter 50 and achieves the membrane treatment tank 51. The control valve 49 regulates the pressure and flowrate of the filtered water flow 48, which is visually controlled by the flowmeter 50. The membrane treatment tank 51 consists of a submerged membrane system formed by PVDF membranes in particular but not limited to an average pore size of 0.07 microns that permits the removal of small solids, specific particles, molecules and substances by applying very low pressures. The membrane filtration system could have a pore size ranging from 0.05 to 0.1 µm, depending on the design flow requirements and water quality sought. Regarding the membrane material, polyarylsulfones (such as polyethersulfone or polysulfone, among others) can be used as an alternative of PVDF material, but PVDF is recommended over other materials due to its good resistance to pure and residual ozone. The number of membranes in the submerged membrane filtration system also depends on the design flowrate and makes the system to be adaptable to the required demand mainly due to the modularity of membrane technology. This allows this system to provide high water fluxes with low energy consumption. To minimize the membrane fouling phenomena and to help the diffusivity and permeation of water through the membrane, an air blower 52 is used. The membrane treatment tank 51 receives water up to a maximum BM2 level, at which the filling process is stopped. When water level is lower than BM2 level, the filling process restarts until reaching BM2 level again. When BM1 level is achieved, the programmable automaton activates both the membrane filtration and the air blower 52. If overflow occurs, flow 53 together with flow 47 form a combined flow 54 which circulates to the rotative sieve 16. In the same way, when the content of solids in the membrane treatment tank 51 exceeds a certain value (more than 15000 ppm), drain valve 55 is automatically opened and the contaminated flow 56 is discharged into the wastewater storage tank 6. This contaminated flow 56 is composed of the accumulated oversize solids, particles, macromolecules and substances retained by the membranes in water.

The separation occurs by steric hindrance or sieving effect in a cross-flow or tangential-flow filtration mode. Cross-flow operations are preferred over dead-end mode due to its lower fouling tendency. Here, the filtered water flows parallel to the membrane surface at a sufficient speed to limit the formation of a foulant layer on the polymeric surface and pore walls of the membrane. This undesired layer is formed by the adsorption and deposition of solutes on them and could result in the saturation and clogging of the membrane. Thus, the rapid flow decline caused by the fouling phenomena is reduced working with these configurations. The permeate flow that selectively tangentially passes to the active layer of the membranes is pumped by action of a suction pump (henceforth membrane pump 59) to the treated water tank 62 in which filtered water is stored. Smaller solutes than the pore size pass through the membrane whereas larger solutes are retained. This process automatically occurs until reaching BM1 level in the membrane treatment tank or BAT2 in the treated water tank. The treated water tank 62 is flat-bottomed and can be constructed of any material or combination of materials that can resist the corrosion caused by the water storage (polymer, carbon steel, stainless steel, polymer-coated steel, glass fiber, among others). Its volume is ranged between 1.000 and 30.000 liters but could be even higher depending on the production of treated water. Control valve 58 is installed in the permeate flow 57 to control the pressure and flowrate of the membrane filtration, which is visually controlled by flowmeter 61. Before being stored in the treated water tank 62, permeate flow 57 is filtered by through an activated carbon filter 60 in order to eliminate remaining odor and colored molecules by adsorption. As was previously mentioned, the implementation of carbon adsorption depends on the quality sought. Treated water flow 63 circulates to washing machines by using a centrifugal pump 64. A water meter 65 is located at the outlet of the treated water tank 62 to control the quantity of water reclaimed with the wash-water reclamation system. In the case of not achieving BAT1 level, the water reclamation system closes down operations as soon as practicable until BAT1 level can be restored with treated water. In the case of overflow 70, this flow circulates to the membrane treatment tank 51. Additionally, a pneumatic drain valve 66 is automatically opened in programmable regular intervals and flow 67 is discharged into the wastewater storage tank 6 in order to remove any settleable solid located at the bottom of the treated water tank 62. Flow 68 is the combination of flows 14, 23, 41, 56 and 67, which corresponded to the drainage of pre-filter 11, dirty water tank 19, treatment tank 29, membrane treatment tank 51 and treated water tank 62, respectively. Flow 68 circulates to the wastewater storage tank 6 with the purpose of reclaiming the maximum amount of water that was introduced in the wash-water reclamation system. A waste flow 69 is generated by the sedimentation of large solids and fibers.

Figure 7A:
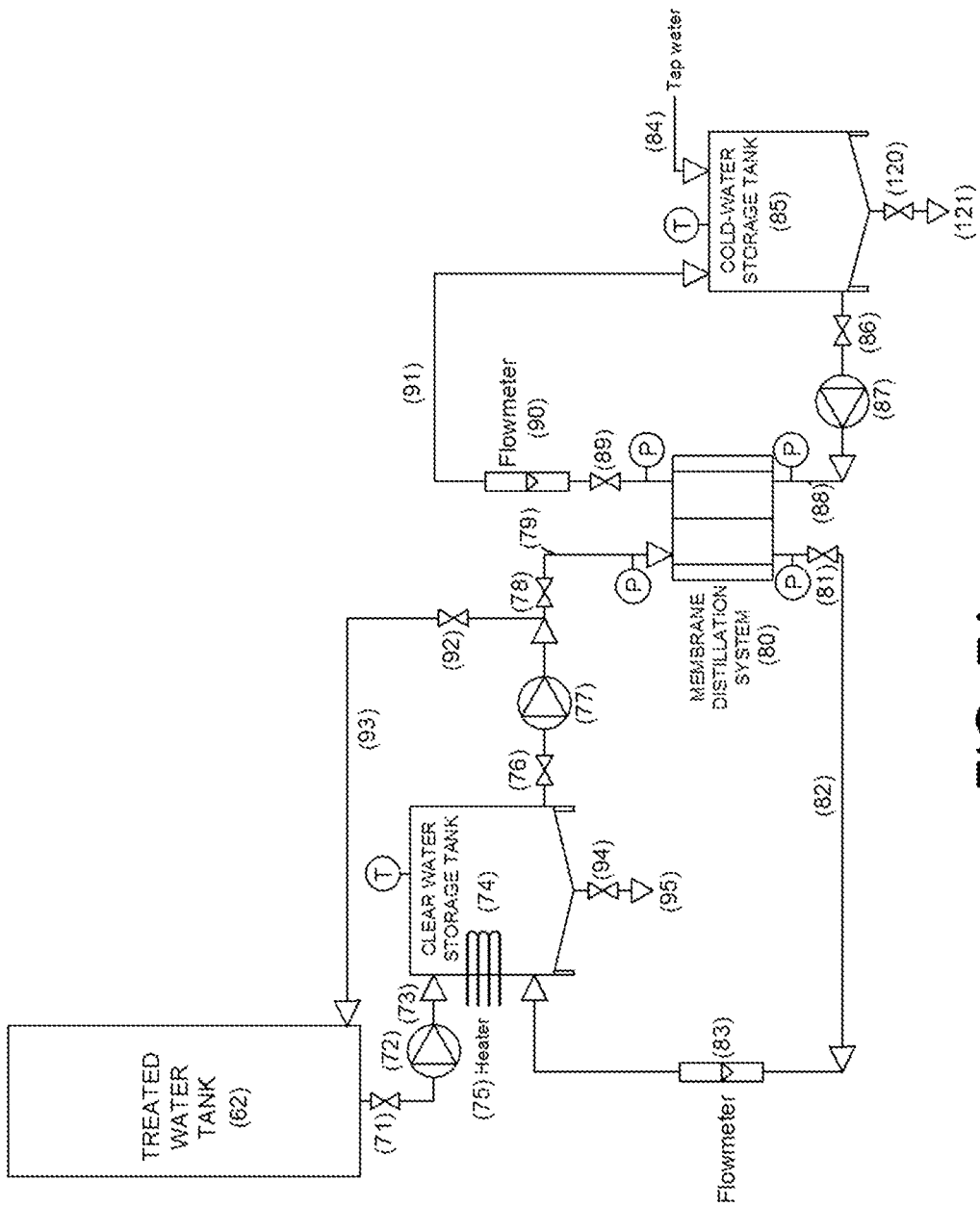
FIG. 7A is a generalized scheme of an embodiment of the desalination process illustrating the membrane distillation system.

Next is detailed the desalination module 4, which is displayed in FIG. 7A. Desalination process removes the salt content existing in the treated water without compromising the main process of the wash-water reclamation system. When electrical conductivity shows higher values than a settable limit predetermined in the programmable automation, the drain valve 71 automatically opens and flow 73 is pumped with the help of a circulation pump 72 to a clear water storage tank 74. This cylindrical-conical tank has a total volume of 3000 liters approximately and should be constructed by salt-resistant (or corrosion-resistant) materials, such as specific stainless-steel alloys, polymeric materials (such as TFE, PTFE, LDPE, SAN or PFA) or hybrid materials. Alternatively, the volume and dimensions of this tank can be adapted to the demands of the installation. The clear water storage tank 74 is equipped with a heater 75 to increase the water temperature up to 70-80° C. The desalination process starts when the pneumatic valves 76 and 78 automatically open and valve 92 is closed, pumping (by using a circulation pump 77) the heated flow 79 to the membrane distillation system 80 where the desalination process takes place. The membrane distillation system is a thermally separation process using a polymeric membrane with a high hydrophobicity where the driving force is given by a partial vapor pressure gradient (provoked by a difference of temperature) between both sides of the membrane. The direct contact membrane distillation system consists of two chambers, feed and permeate, and is made up of, but not limited to, 304 stainless steel. It should be noted that the materials composing the system should be able to withstand huge differences of temperature (up to 50° C.) between both chambers. Both chambers also have some rubber separators with a very small thickness (lower than 5 mm). The heated flow 79 tangentially circulates to the hydrophobic active layer of the membrane. In the other side of the membrane distillation system 80, a cold flow of tap water 88 circulates in a counterflow direction to favor heat and mass transfer between heated and cold flow. The exiting concentrated flow 82, immediately generated after mass transfer, returns to the clear water storage tank 74 passing through a control valve 81 and a flowmeter 83, which are installed to control the pressure and flowrate of the concentrated flow 82. Meanwhile, when the pneumatic valve 86 is automatically opened, this cold flow 88 is transferred by using a circulation pump 87 from the cold-water storage tank 85 (fed by a tap water source 84) to the membrane distillation system 80, where the exiting flow 91 drags the condensed liquid obtained after the desalination process and returns to the cold-water storage tank 85. Cold water storage tank 85 has also an exit of the condensed water (not shown in the figures) and a drain valve 120 with the corresponding drainage 121. The pressure and flowrate are respectively controlled by a control valve 89 and a flowmeter 90 which are located at the exiting flow 91. When the salt content inside the clear water storage tank 74 reaches its characteristic point of saturation, salts precipitate at the bottom of the tank and the drain valve 94 automatically opens and a waste flow 95 is generated to be managed. The supernatant salt-free treated water 93 is then pumped it into the treated water tank 62 by automatically opening valves 76 and 92 and closing pneumatic valve 78 at the same time.

Figure 6B:
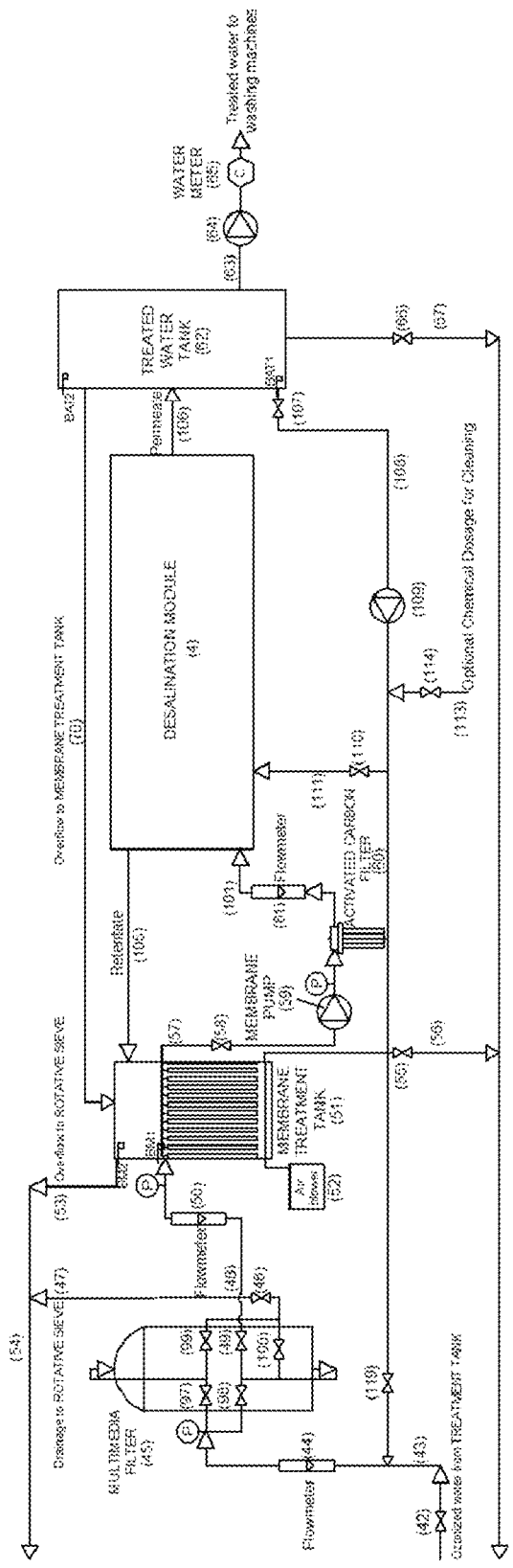
FIG. 6B depicts a schematic view of the tertiary treatment of FIG. 2B, where the components of the refinement treatment are specifically represented.
Figure 7B:
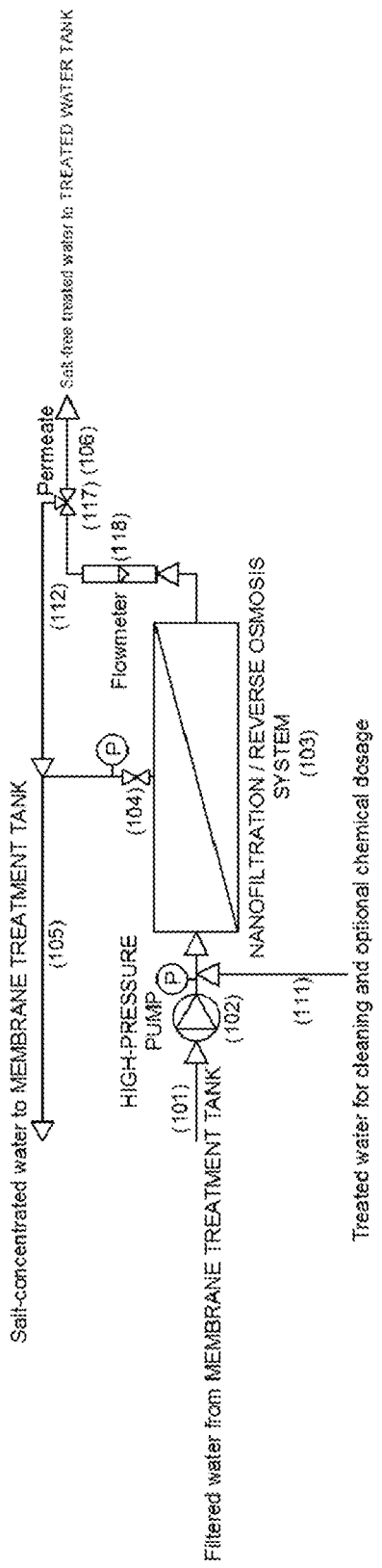
FIG. 7B is a generalized scheme of another embodiment of the desalination process illustrating the nanofiltration/reverse osmosis system and its supplementary equipment to ensure its proper operation during production of treated water.

For larger volumes and higher design flow requirements, the desalination process 4 is implemented into the tertiary module as one more production step and is shown in FIGS. 6B and 7B. After filtering the water through the optional activated carbon adsorption system 60, the odorless filtered water 101 is treated into the desalination module 4 to produce a salt-free water 106, which is stored into the treated water tank 62. Odorless filtered water 101 is pumped by a high-pressure pump 102 that provides pressures ranging from 5 to 20 bar to significantly reduce its salt content. The desalination system 103 is formed by different tight nanofiltration and/or loose reverse osmosis membranes configured to achieve the design flow requirements. There is no need to work with higher pressures than those indicated because the implementation of supplementary equipment resistant to high pressures will increase vastly the cost of all the nanofiltration/reverse osmosis system 103 without obtaining significant differences in its performance. For instance, tight nanofiltration membranes and loose reverse osmosis (with molecular weights lower than 300 Da) show high removal efficiencies for NaCl, $MgSO_4$ or $CaCO_3$ (85-95%, >97% and >95%, respectively), which make them competitive in the textile industry and garment finishing compared to the high-pressure reverse osmosis. The transmembrane pressure (defined as the pressure gradient between both sides of a single membrane) is controlled by the action of the control valve 104 and two manometers P located at the inlet and outlet of the nanofiltration/reverse osmosis system 103, while the flowmeter 118 monitors the permeate flow 106 obtained after the treatment. The retentate or concentrated flow with high salt concentration 105 circulates to the membrane treatment tank 51. The number of membranes will depend on the design flow requirements, ranging from 2 to 25 $m^3/h$. The same cleaning circuit used for the multimedia filter 45 can be employed to perform the cleaning of the desalination module 4 by implementing two control valves, namely 110 and 117, which are activated during cleaning process. In this process, the permeate flow 112 is recirculated to the membrane treatment tank 51 to be retreated and reduce the organic load deposited on the nanofiltration/reverse osmosis system 103. The feed flow 111 would be formed by salt-free treated water and, in the worst-case scenario, chemicals 113 introduced into the system (connected to the salt-free water flow 108) by a control valve 114 in order to perform a complete maintenance of the system. This step is optional and can be added to remove adsorbed solutes on the system and in the inner structure of the equipment.

Figure 9:
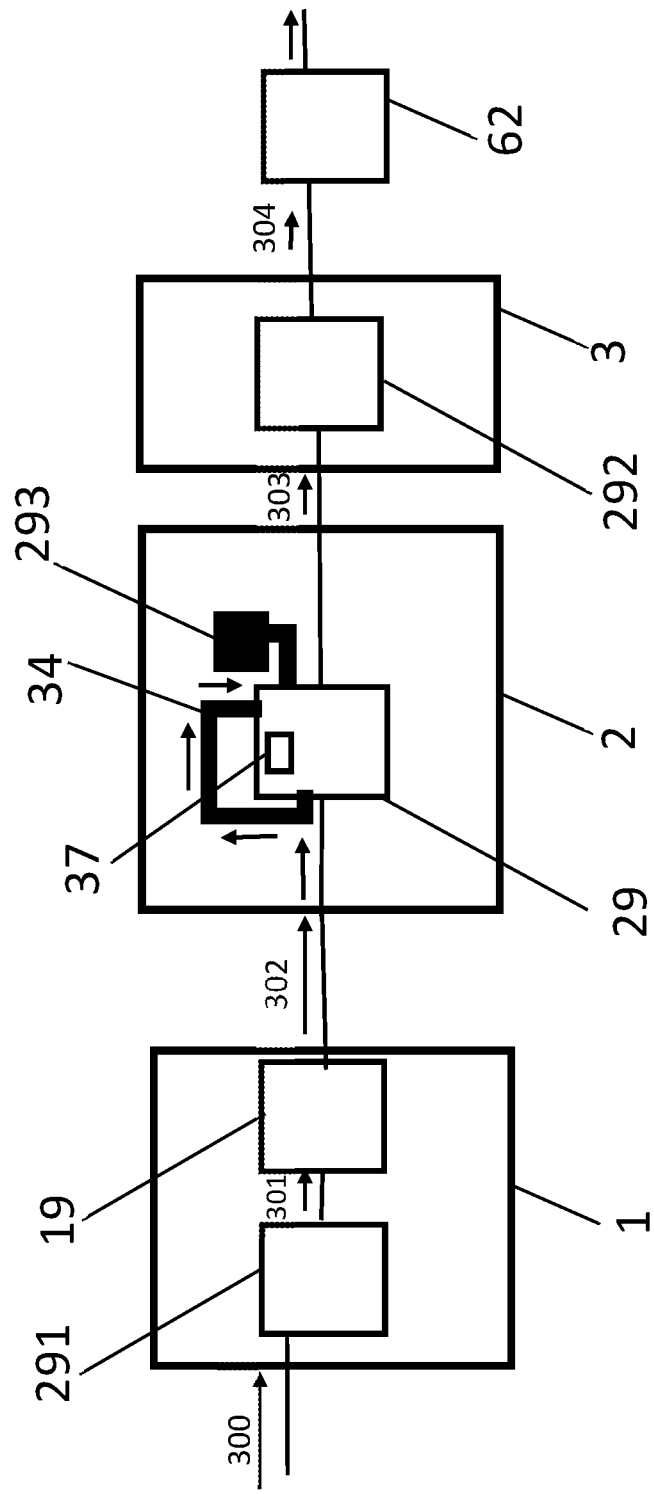
FIG. 9 is a system block diagram of a preferred embodiments of the water reclamation system that describes the interconnection between the system's modules and components therein.

From the above it is evident that a preferred embodiment of the water reclamation system of the present invention is a water reclamation system for the textile industry, that is schematically described in FIG. 9 and comprises: [a] a primary module 1 with separation means 291 and a dirty water tank 19, [b] a secondary module 2 with a treatment tank 29, ozone generating means 293, a recirculation circuit 34, 36 and a catalyst filter 37, [c] a tertiary module 3 with filtration means 292, and [d] a treated water tank 62, wherein the separation means 291 is a mechanical filtration system, and:
  the primary module 1 is configured to receive wastewater provided to the water reclamation system;
  the mechanical filtration system is configured to remove particles from the wastewater thusly converting the latter to dirty water;
  the dirty water tank 19 is connected to the mechanical filtration system and configured to receive from the latter dirty water;
  the treatment tank 29 of the secondary module 2 is connected to the primary module 1 and configured to receive from the latter dirty water;
  the ozone generating means 293 are connected to the treatment tank 29 and configured to supply to the latter ozone for treating the dirty water in the treatment tank 29 via the application of the ozone to the dirty water and the reaction of the latter with the ozone;
  the recirculation circuit 34, 36 is connected to the treatment tank 29 and configured to continuously pump dirty water from and to the treatment tank 29 forming a recirculation loop within the secondary module 2 to promote therein the supply and mixing of ozone into the dirty water thusly promoting the reaction of ozone with the dirty water;

the catalyst filter 37 is configured to transform to oxygen any ozone that does not react with the dirty water in the treatment tank 29;

the treatment tank 29 is closed and sealed so that ozone application is made in a completely sealed enclosure;

the tertiary module 3 is connected to the secondary module 2 and configured to receive from the latter dirty water that has been treated with ozone;

the filtration means 292 are configured to remove particles from the dirty water that has been treated with ozone, thusly converting the latter to treated water;

the treated water tank 62 is connected to the tertiary module 3 and configured to receive from the latter the treated water.

In FIG. 9 black arrows indicate the preferable flow of water in between and within the modules and components thereof. The following flows are specifically indicated:

the supply 300 of wastewater to the system and to the primary module 1 and separation means 291 of the system, the supply 301 of dirty water from the separation means 291 to the dirty water tank (19)

the supply 302 of dirty water from the primary module 1 and dirty water tank 19 to the secondary module 2 and to the treatment tank 29, the flow 306 of dirty water from and to the treatment tank 29 and through the recirculation circuit 34 and the recirculation loop formed with the latter, the supply 303 of dirty water processed with ozone from the secondary module 2 and the treatment tank 29 to the tertiary module 3 and the filtration means 292, the supply 304 of treated water from the tertiary module 3 and the filtration means to the treated water tank 62, the supply 305 of the treated water towards outside the system so that the treated water can be reused.

In FIG. 9. the ozone generation means 293, are depicted being connected to the treatment tank 29 providing therein ozone. Optionally the ozone generating means 293 are configured for injecting/supplying the ozone in any of the following manners:

directly inside the dirty water contained in the treatment tank 29, and/or directly in the dirty water passing through the recirculation circuit 34, and/or into a part of the treatment tank 29 which is not filled with dirty water but communicates with the dirty water in the treatment tank 29 permitting the ozone to contact and progressively be mixed with the dirty water.

Moreover, it is evident that the present invention in a second aspect concerns a method for water reclamation and water treatment. Most preferably the method concerns water reclamation and water treatment in the textile industry. In a preferred embodiment, the method comprises the use of the a water reclamation system that is according to any of the preceding embodiments of the system, the system comprising [a] a primary module 1 with separation means 291 and a dirty water tank 19, [b] a secondary module 2 with a treatment tank 29, ozone generating means 293, a recirculation circuit 34, 36 and a catalyst filter 37, [c] a tertiary module 3 with filtration means 292, and [d] a treated water tank 62, wherein the separation means 291 is a mechanical filtration system, the method further comprising the steps of:

converting the wastewater to dirty water via removing particles from the wastewater using the mechanical filtration system;

supplying ozone to the treatment tank 29 using the ozone generating means 293;

within the treatment tank 29 treating the dirty water with the ozone;

using the recirculation circuit 34, 36 continuously pumping dirty water from and to the treatment tank 29;

using the catalyst filter 37 transforming to oxygen any ozone that does not react with the dirty water in the treatment tank 29;

using the filtration means 292 removing particles from the dirty water that has been treated with ozone, thusly converting the latter to treated water.

In an even more preferred embodiment of the method that is according to the embodiment mentioned above, the method does not comprise applying biofiltration.

It is clarified that all variations and embodiments of the system of the invention described herein can be used for implementing the water treatment method of the invention, and any action that is explicitly or implicitly mentioned herein in relation of the elements of the water reclamation system, can also be considered as being a part or step or feature of the method of the invention.

As an example of the performance of the wash-water reclamation system with real wastewater from textile industry and garment finishing, Example 1 shows the results obtained for different water-quality indicators before and after being the water treated with the present wash-water reclamation system and the removal efficiencies of such parameters. The results were obtained under the following conditions: the design flows ranged from 0.5 to 25 m$^3$/h, ozone flow was 9 m$^3$/h, ozone concentration of 90 wt %, the flat-sheet membrane treatment tanks were designed to provide the same flow as the design flow of all system and were used as feed for the desalination treatment. In the case of larger volumes, the desalination treatment was composed by pressure membrane modules arranged in a 'Christmas tree' with tight nanofiltration membranes, which array to maintain a high feed velocity through modules.

| Example 1. Physicochemical characteristics of the water used for working with the H$_2$Zero system. | | | | |
|---|---|---|---|---|
| Item | Indicators | Before H$_2$Zero | After H$_2$Zero | Removal (%) |
| 1 | COD (mg O$_2$/L) | 2200-4000 | 5-23 | 98.9-99.8 |
| 2 | BOD$_5$(mg O$_2$/L) | 70-150 | 0-2 | 98.7-99.9 |
| 3 | SST (ppm) | 400-600 | <5 | >98.0 |
| 4 | N$_{total}$ (mg/L) | 20-30 | 1-4 | 80.0-96.7 |
| 5 | Color (PCU) | ≥900 | 5-30 | 96.7-98.0 |
| 6 | pH | 7-10 | 7-10 | — |

Although specific terms are used in the previous description for the sake of clarity, these terms have been presented for the purposes of illustration and description of the invention. It is not intended to be exhaustive or limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use.

BIBLIOGRAPHY

X. A. Ning, J. Y. Wang, R. J. Li, W. B. Wen, C. M. Chen, Y. J. Wang, Z. Y. Yang, J. Y. Liu, Fate of volatile aromatic hydrocarbons in the wastewater from six textile dyeing wastewater treatment plants, Chemosphere 136 (2015) 50-55.

A. Muezzinoglu, A study of volatile organic sulfur emissions causing urban odours, Chemosphere 51 (2003) 245-252.

B. Z. Wu, T. Z. Feng, U. Sree, K. H. Chiu, J. G. Lo, Sampling and analysis of volatile organics emitted from wastewater treatment plant and drain system of an industrial science park, Analytica Chimica Acta 576 (2006) 100-111.

The invention claimed is:

1. A water reclamation system for the textile industry, comprising: [a] a primary module with separation means and a dirty water tank, [b] a secondary module with a treatment tank, ozone generating means, a recirculation circuit and a catalyst filter, [c] a tertiary module with filtration means, and [d] a treated water tank, wherein the separation means is a mechanical filtration system, and:
   the primary module is configured to receive wastewater provided to the water reclamation system;
   the mechanical filtration system is configured to remove particles from the wastewater thusly converting the wastewater to dirty water;
   the dirty water tank is connected to the mechanical filtration system and configured to receive from the mechanical filtration system dirty water;
   the treatment tank of the secondary module is connected to the primary module and configured to receive from the primary module dirty water;
   the ozone generating means are connected to the treatment tank and configured to supply to the treatment tank ozone for treating the dirty water in the treatment tank via the application of the ozone to the dirty water and the reaction of the dirty water with the ozone;
   the recirculation circuit is connected to the treatment tank and configured to continuously pump dirty water from and to the treatment tank forming a recirculation loop within the secondary module to promote therein the supply and mixing of ozone into the dirty water thusly promoting the reaction of ozone with the dirty water;
   the catalyst filter is configured to transform to oxygen any ozone that does not react with the dirty water in the treatment tank;
   the treatment tank is closed and sealed so that ozone application is made in a completely sealed enclosure;
   the tertiary module is connected to the secondary module and configured to receive from the secondary module dirty water that has been treated with ozone;
   the filtration means of the tertiary module are configured to remove particles from the dirty water that has been treated with ozone, thusly converting the dirty water to treated water;
   the treated water tank is connected to the tertiary module and configured to receive from the tertiary module the treated water;
   wherein the ozone generating means are arranged in the recirculation circuit; and wherein the treatment tank of the secondary module is connected to the primary module by means of the recirculation circuit, such that the treatment tank is configured to receive the dirty water from the primary module through the recirculation circuit.

2. The water reclamation system according to claim 1, wherein the system does not comprise a biological filter nor a biological aerated filter.

3. The water reclamation system according to claim 1, wherein the separation means of the primary module and the filtration means of the tertiary module do not comprise a biological filter nor a biological aerated filter.

4. The water reclamation system according to claim 1, wherein the separation means of the primary module are configured to remove from the water particles with a size greater or equal than 0.05 mm.

5. The water reclamation system according to claim 1, wherein the filtration means of the tertiary module are able to remove particles with a size greater or equal than 0.05 microns.

6. The water reclamation system according to claim 1, wherein the separation means of the first module comprise a rotary drum filter and a rotative sieve.

7. The water reclamation system according to claim 6, wherein said rotary drum filter is able to remove particles with a size greater or equal than 0.5 mm.

8. The water reclamation system according to claim 6, wherein said rotative sieve is able to remove particles with a size greater or equal than 0.1 mm.

9. The water reclamation system according to claim 1, wherein said ozone generating means comprises an oxidation advanced process to reduce COD and color in non treated water.

10. The water reclamation system according to claim 1, wherein said filtration means of the tertiary module comprise a multimedia filter.

11. The water reclamation system according to claim 10, wherein said multimedia filter is able to remove particles with a size greater or equal than 5 microns.

12. The water reclamation system according to claim 10, wherein said multimedia filter comprises a bed of glass, a bed of zeolite and a bed of sand.

13. The water reclamation system according to claim 1, wherein said filtration means of the tertiary module comprise a submerged membrane filtration system.

14. The water reclamation system according to claim 13, wherein said submerged membrane filtration system has an average pore size comprised between 0.05 and 0.1 microns.

15. The water reclamation system according to claim 13, wherein said submerged membrane filtration system has PVDF ultrafiltration membranes.

16. The water reclamation system according to claim 1, wherein said treatment tank having an ozone outlet that is connected with said dirty water tank.

17. The water reclamation system according to claim 1, wherein the nominal design flow of water to be treated is between 0.5 and 25 $m^3/h$.

18. The water reclamation system according to claim 1, comprising [e] a desalination module.

19. The water reclamation system according to claim 18, where said desalination module is connected to said treated water tank, receiving water to be desalinated from said treated water tank through a drain valve and a flow, where said drain valve and said flow are in parallel to a treated water flow that exits said water reclamation system.

20. The water reclamation system according to claim 19, where said desalination module comprises a membrane distillation system.

21. The water reclamation system according to claim 18, where said desalination module is connected in series between said filtration means of the tertiary module and said treated water tank, where the only inlet of water of said treated water tank is salt-free water coming from said desalination module.

22. The water reclamation system according to claim 21, where said desalination module comprises a reverse osmosis system.

23. The water reclamation system according to claim 22, where said desalination module has a high-pressure pump that feeds filtered water into said reverse osmosis system, where said high-pressure pump has a maximum nominal pressure lower or equal than 20 bar.

24. The water reclamation system according to claim 1, further comprising water electrical conductivity measuring means for water electrical conductivity control of water in said treated water tank and means for diverting water from said treated water tank to said desalination module if said water electrical conductivity is over a pre-established value.

25. The water reclamation system according to claim 1, wherein said filtration means of the tertiary module comprise an activated carbon filter.

26. The water reclamation system according to claim 1, wherein the dirty water tank is sealed, the treatment tank comprises an ozone outlet configured to conduct water from the sealed treatment tank to sealed dirty water tank, so that residual ozone of the water coming from the treatment tank is allowed to react with the dirty water of the sealed dirty water tank.

27. The water reclamation system according to claim 26, wherein the residual ozone remaining after reacting with the dirty water is subsequently decomposed by the catalyst filter, forming oxygen.

28. A method for wastewater treatment for the textile industry, comprising: using a water reclamation system, the system comprising [a] a primary module with separation means and a dirty water tank, [b] a secondary module with a sealed treatment tank, ozone generating means, a recirculation circuit and a catalyst filter, [c] a tertiary module with filtration means, and [d] a treated water tank, wherein the separation means is a mechanical filtration system, the method further comprising:
adding wastewater obtained from the textile industry by means of the primary module;
converting the wastewater to dirty water via removing particles from the wastewater using the mechanical filtration system;
supplying ozone to the sealed treatment tank using the ozone generating means;
within the sealed treatment tank treating the dirty water with the ozone;
using the recirculation circuit continuously pumping dirty water from and to the sealed treatment tank;
using the catalyst filter transforming to oxygen any ozone that does not react with the dirty water in the sealed treatment tank;
using the filtration means of the tertiary module for removing particles from the dirty water that has been treated with ozone, thusly converting the dirty water to treated water;
wherein the method further comprises using an ozone outlet of the sealed treatment tank to conduct water from the sealed treatment tank to the dirty water tank, so that residual ozone of the water coming from the sealed treatment tank is allowed to react with the dirty water of the dirty water tank.

29. The method according to claim 28, wherein the method does not comprise applying biofiltration.

\* \* \* \* \*